(12) United States Patent
Utsunomiya

(10) Patent No.: US 7,034,954 B1  
(45) Date of Patent: Apr. 25, 2006

(54) PRINT CONTROL APPARATUS CAPABLE OF PROCESSING STORE PRINT JOB AND INFORMATION PROCESSING APPARATUS CAPABLE OF DISPLAYING STORE PRINT JOB

(75) Inventor: Takeshi Utsunomiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/572,914

(22) Filed: May 17, 2000

(30) Foreign Application Priority Data

| May 20, 1999 | (JP) | ................................. 11-139627 |
| Sep. 17, 1999 | (JP) | ................................. 11-263907 |

(51) Int. Cl.  
 *G06F 15/00* (2006.01)

(52) U.S. Cl. ....................... 358/1.16; 399/83

(58) Field of Classification Search ............... 358/1.15, 358/1.16, 444; 399/8–10, 81–83; 709/212–219, 709/224; 710/52–57, 36–45; 718/100–102  
See application file for complete search history.

(56) References Cited

U.S. PATENT DOCUMENTS

| 4,947,345 | A | | 8/1990 | Paradise et al. ............. 364/519 |
| 5,095,369 | A | | 3/1992 | Ortiz et al. ................. 358/296 |
| 5,371,873 | A | | 12/1994 | Niwa ......................... 395/425 |
| 5,483,623 | A | | 1/1996 | Nagashima ................. 395/115 |
| 5,517,316 | A | * | 5/1996 | Hube ......................... 358/296 |
| 5,715,381 | A | * | 2/1998 | Hamilton .................... 358/1.15 |
| 5,815,764 | A | * | 9/1998 | Tomory ......................... 399/1 |
| 5,956,471 | A | | 9/1999 | Ueda et al. .................. 395/113 |
| 6,229,620 | B1 | | 5/2001 | Makitani et al. ........... 358/1.15 |
| 6,433,880 | B1 | * | 8/2002 | Nishikata et al. .......... 358/1.13 |
| 6,433,882 | B1 | * | 8/2002 | Mori et al. ................. 358/1.13 |
| 6,567,179 | B1 | * | 5/2003 | Sato et al. ................. 358/1.15 |
| 6,618,163 | B1 | * | 9/2003 | Roosen et al. ............. 358/1.15 |
| 6,667,816 | B1 | * | 12/2003 | Van Buren et al. ........ 358/3.13 |
| 2002/0036793 | A1 | * | 3/2002 | Roosen et al. ............. 358/1.15 |
| 2002/0067496 | A1 | * | 6/2002 | Nishikata et al. .......... 358/1.13 |
| 2002/0149788 | A1 | * | 10/2002 | Nishikata et al. .......... 358/1.14 |
| 2003/0208607 | A1 | * | 11/2003 | Yamazaki .................... 709/229 |

FOREIGN PATENT DOCUMENTS

| EP | 0913986 A1 | * | 5/1999 |
| EP | 0943985 A1 | * | 9/1999 |
| EP | 0943986 A1 | * | 9/1999 |
| EP | 0943987 A1 | * | 9/1999 |
| EP | 0944238 A1 | * | 9/1999 |
| EP | 0944239 A1 | * | 9/1999 |
| JP | 10011234 A | * | 1/1998 |

* cited by examiner

*Primary Examiner*—Maria N. Von Buhr  
(74) *Attorney, Agent, or Firm*—Fitzpatrick, Cella, Harper & Scinto

(57) ABSTRACT

A list of print jobs stored in a printer, namely, print jobs by which an instruction of a change in attributes of the print jobs and an execution of the printing of the print jobs can be issued anytime is displayed on a display apparatus, thereby enabling the user to recognize such print jobs, select one of them, and issue a print executing instruction for the selected print job.

44 Claims, 21 Drawing Sheets

FIG. 4

| BYTE \ BIT | 7 | 6 | 5 | 4 | 3 | 2 | 1 | 0 |
|---|---|---|---|---|---|---|---|---|
| 0 | | | | OPERATION CODE | | | | |
| 1 | | | | | | | | |
| 2 | | | | BLOCK NO. | | | | |
| 3 | | | | | | | | |
| 4 | | | | PARAMETER LENGTH | | | | |
| 5 | | | | | | | | |
| 6 | ERROR FLAG | NOTICE FLAG | | | | REPLY REQUEST FLAG | CONTINUATION FLAG | REPLY FLAG |
| 7 | | | | USER ID | | | | |
| 8 | | | | | | | | |
| 9 | | | | | | | | |
| 10 | | | | PASSWORD | | | | |
| 11 | | | | | | | | |
| 12~ | | | | DATA SECTION | | | | |

FIG. 18

| FOR PRINTER |
| --- |
| CONTROL PROGRAM FOR I/F DRIVER |
| CONTROL PROGRAM FOR LOGIC CHANNEL CONTROLLER |
| CONTROL PROGRAM FOR JOB PRE-PROCESSOR |
| CONTROL PROGRAM FOR PDL TRANSLATOR |
| CONTROL PROGRAM FOR STORE PRINT PROCESSOR |
| CONTROL PROGRAM FOR INFORMATION MANAGER |
| CONTROL PROGRAM FOR DRAWER |
| CONTROL PROGRAM FOR PRINTER ENGINE |
| CONTROL PROGRAM FOR OPERATION PANEL |
| CONTROL PROGRAM FOR FLOWCHART OF FIG. 7 |
| CONTROL PROGRAM FOR FLOWCHART OF FIG. 9 |
| CONTROL PROGRAM FOR FLOWCHART OF FIG. 14 |

| FOR HOST COMPUTER |
| --- |
| CONTROL PROGRAM FOR I/F DRIVER |
| CONTROL PROGRAM FOR LOGIC CHANNEL CONTROLLER |
| CONTROL PROGRAM FOR PRINTER DRIVER |
| CONTROL PROGRAM FOR APPLICATION |
| CONTROL PROGRAM FOR JOB PACKET GENERATOR |
| CONTROL PROGRAM FOR UTILITY |
| CONTROL PROGRAM FOR FLOWCHART OF FIG. 5 |
| CONTROL PROGRAM FOR FLOWCHART OF FIG. 6 |

| JOB NAME | JOB OWNER | JOB ID |
|----------|-----------|--------|
| "JOB4"   | "USER-A"  | 201    |
| "JOB5"   | "USER-B"  | 202    |
| "JOB6"   | "USER-C"  | 203    |

PRINT CONTROL APPARATUS CAPABLE OF PROCESSING STORE PRINT JOB AND INFORMATION PROCESSING APPARATUS CAPABLE OF DISPLAYING STORE PRINT JOB

BACKGROUND OF THE INVENTION

1. Field of the Invention

The invention relates to a print system comprising: a host computer for forming print data in accordance with an instruction from the user; and a printer for forming image data by processing the print data transmitted from the host computer via a predetermined communication medium and actually printing it into a media such as a paper or the like.

2. Related Background Art

Hitherto, in a print system comprising a host computer and a printer, it is required not only that the printer prints on the basis of print data which is formed by the host computer but also that the getting of information of the printer and the setting of an environment thereof can be performed by the host computer.

Particularly, owing to the widespread implementation of networks in the printing environment, it has become popular to allow a plurality of users to share one printer having a high print processing speed and advanced functions via a network. This satisfies the need for large capacity printing in an office while minimizing management costs. Under such a situation, an administrator naturally wants to manage the printer in a real-time manner from some remote location without having to actually visit the printer. In addition, a user generally desires to perform secondary operations such as confirmation or cancellation of a processing situation of a print job issued by the user.

Many print systems which satisfy those requests have been considered.

FIG. 1 shows an example of such a print system which satisfies the above requests and is a block diagram showing a functional construction of the print system embodying a mechanism for transmitting a print job from the host computer to a printer, getting information of the printer, and setting an environment thereof. In the print system, a host computer 100 and a printer 150 are connected via a predetermined print medium 180.

The host computer 100 comprises: an application 101; a printer driver 102; a transmission buffer 103; an I/F driver 104; a utility 105; a logic channel controller 106; and a job packet generator 107.

The application 101 provides a graphical user interface to the user and forms image data according to an object of the user. The printer driver 102 converts the image data formed by the application 101 into page description language (hereinafter, abbreviated to PDL) data which can be printed by the printer 150. The transmission buffer 103 temporarily stores the PDL data formed by the printer driver 102. The job packet generator 107 adds job information of a print job which the application 101 possesses to the PDL data stored in the transmission buffer 103, thereby generating a job packet in accordance with a predetermined format.

The utility 105 obtains the information regarding the printer 150, provides a graphic user interface, and forms a management packet for setting information of apparatuses in the printer 150 in accordance with demands of the user and the administrator. The utility 105 also forms a management packet for requesting to obtain or cancel a status of the print job.

The logic channel controller 106 controls multiplication of the job packet formed by the job packet generator 107 and the management packet formed by the utility 105 and has a role as a transport layer in the OSI (Open Systems Interconnection) 7 layer. The I/F (Interface) driver 104 performs the transmission of the data generated from the logic channel controller 106 and the reception of the data transmitted from the printer 150.

The printer 150 comprises: a logic channel controller 151; a database 152; a job pre-processor 153; a reception buffer 154; a PDL translator 155; a draw buffer 156; a drawer 157; a printer engine 158; an I/F driver 159; an information manager 160; and an operation panel 161.

The I/F driver 159 receives the data transmitted from the host computer 100 and transmits the data formed by the logic channel controller 151. The logic channel controller 151 analyzes the data received by the I/F driver 159, attributes the job packet to the job pre-processor 153, distributes the management packet to the information manager 160, and contrarily transmits the management packet transmitted from the information manager 160 to the I/F driver 159.

The job pre-processor 153 receives and interprets the job packet, sends the PDL data to the reception buffer 154, and sends the job information of the job to the database 152.

The PDL data has been stored in the reception buffer 154 in receiving order. The job information such as the number of copies and the like and information regarding the apparatuses has been stored in the database 152.

The PDL translator 155 executes a translating process on the basis of the PDL data stored in the reception buffer 154 and the job information stored in the database, converts the PDL data into intermediate data which can be drawn by the drawer 157 in a real-time manner, and transmits the intermediate data to the draw buffer 156.

The draw buffer 156 stores the intermediate data of a plurality of pages and sends it to the drawer 157. The drawer 157 obtains the intermediate data from the draw buffer 156, performs a rendering of the intermediate data in a real-time manner in association with the paper conveying process which is performed by the printer engine 158, and transmits video data to the printer engine 158. The printer engine 158 physically prints an image onto a paper on the basis of the video data transmitted from the drawer 157 by using the well-known electrophotographic technique.

The information manager 160 receives an information obtaining request from the utility 105 in a form of the management packet, obtains the necessary information from the database 152, converts it into a management packet, and replies to the host computer via the logic channel controller 151. The information manager 160 detects the end of the job, autonomously converts an end notice of the job into a management packet, and sends it to the host computer.

The operation panel 161 is equipped for the main body of the printer 150 and comprises a display apparatus such as liquid crystal, LED, or the like and operation buttons. The operation panel 161 executes a process for reflecting the input (setting) from the user to the database via the information manager or displaying the present status of the apparatus.

Processes in the case where the printer 150 receives a print request of the print job will now be described. When the printer 150 receives the print request of the print job, the job pre-processor 153 recognizes this new print job and allocates a job ID which is unconditionally held in the printer to this print job. Such information is stored in the database 152. The information is deleted at a stage when all pages of the print job are interpreted and drawn and it is detected in the printer engine 158 that the paper ejection of the last one page has been completed.

A mechanism of the function to cancel the job in the print system will now be described.

The job cancelling function is a function for requesting a cancellation of the print of the print job transmitted to the printer from the user or administrator who issued the print request. The user or administrator requests the cancellation from the user interface of the utility 105 or from the operation panel 161.

The utility 105 issues a management packet to request the getting of a job list in the apparatus to the printer 150. The printer 150 transmits a list of the job IDs of all of the print jobs recognized in the apparatus. The utility 105 receives the job ID list and displays statuses of the print jobs in the apparatus by using the graphic user interface.

When the user who transmitted the print job or the administrator of the printer selects a certain print job among the displayed print jobs and requests the cancellation of the selected print job, namely, when the job ID of the print job whose printing is cancelled is designated by the graphic user interface of the utility 105, a management packet of a job cancel request is formed and transmitted to the printer 150. When the management packet of the job cancel request is transmitted to the printer 150, the information manager 160 detects it. When the PDL data or intermediate data regarding the print job exists on a print path, specifically speaking, on the reception buffer 154, PDL translator 155, draw buffer 156, and drawer 157, an invalidation, a deletion, an erasure, or the like of those data or an interruption of the processes of those data is performed.

In case of cancelling the job from the operation panel 161, it is difficult to clearly designate the job ID. Therefore, the print job whose process has been progressed most on the print path is set to a target for cancellation. Specifically speaking, when the job is processed by the printer engine 158, this job is set to a target for cancellation. In another case, the job that is being processed in the drawer 157 becomes a target. In still another case, the job that is being processed in the PDL translator 155 becomes a target. In this manner, when the job under processing is found on the print path, the job ID of such a job is set to a target for cancellation and the job ID of the relevant job is specified.

The actual cancelling process of the job by the operation panel in the printer is substantially the same as that by the utility 105 except for a point that a deciding method of the job as a target for cancellation differs. By the above operations, an arbitrary job in the printer 150 can be cancelled.

SUMMARY OF THE INVENTION

Further, the need for new services arises because of the widespread use of computer networks within printing environments in which a plurality of users share a high speed printer having advanced functions.

That is, there is a demand for changing the setting of a print job which has been stored once in the printer and reprinting. For example, there is a case where in order to print a plurality of copies, a test print is performed once, a print result is confirmed, and thereafter, the user wants to newly start the printing of a large quantity of papers. In this instance, the print job is first processed by setting "the number of copies=1" and "a toner saving mode=ON". When the printing is newly started, the setting is changed to "the number of copies=10" and "a toner saving mode=OFF" without retransmitting the print job and the print job is processed.

The invention is made in consideration of the above point and it is an object of the invention to provide a construction in which while a print job is stored in a printer, an instruction to change an attribute of the print job and execute a printing of the print job is enabled to be issued anytime, thereby making it possible to perform a reprinting process which can change the attribute of the print job each time.

There is also provided a print job stored in the printer, wherein a list of print jobs in which an instruction to change an attribute of the print job and execute a printing of the print job can be issued anytime is displayed on a display apparatus, thereby enabling the user to recognize such a print job, select one of them, and issue the instruction to execute the printing in response to the selected print job.

In the case where an application for allowing a list of print jobs or registration data stored in the printer to be displayed on a display apparatus of the host computer obtains information regarding the print job from the printer, there are the following information obtaining methods: namely, (1) a method of periodically obtaining the information; (2) a method of obtaining the information by using an event, as; a trigger, for notifying the host computer of the fact that the list of the print jobs or registration data has been changed; (3) a method of obtaining the information by using a trap, as a trigger, for notifying the host computer from the printer of the fact that the list has been changed.

According to the method of (1), however, there is a case where the application obtains the information even if the list is not changed. Therefore, when an amount of data of the list is large or when an interval for obtaining the information is short, a network traffic increases and the performance deteriorates.

According to the method of (2), when a plurality of host computers are connected to the printer, there is a case where the plurality of host computers obtain the information in a lump from the printer in response to the trigger. Consequently, a network traffic temporarily increases and the performance deteriorates.

The invention is made in consideration of the above problems and the host computer obtains information of store jobs managed by the printer and displays a list of them and, thereafter, obtains the number of store jobs managed in the printer anytime and discriminates whether the list has been changed or not on the basis of the number of store jobs. When it is determined that the list has been changed, the latest store job information is obtained and displayed again. By this method, the occurrence of the traffic in association with the getting of the information of the store job is suppressed, thereby enabling the deterioration of an efficiency of a data transfer via a communication medium to be avoided.

BRIEF DESCRIPTION OF THE DRAWINGS

FIG. 4 is an explanatory diagram showing a construction of a job packet;

FIG. 18 is a diagram showing a storage medium on which program codes have been recorded;

DETAILED DESCRIPTION OF THE PREFERRED EMBODIMENT

An embodiment of the invention will be described hereinbelow.

Print System

Figure 1:
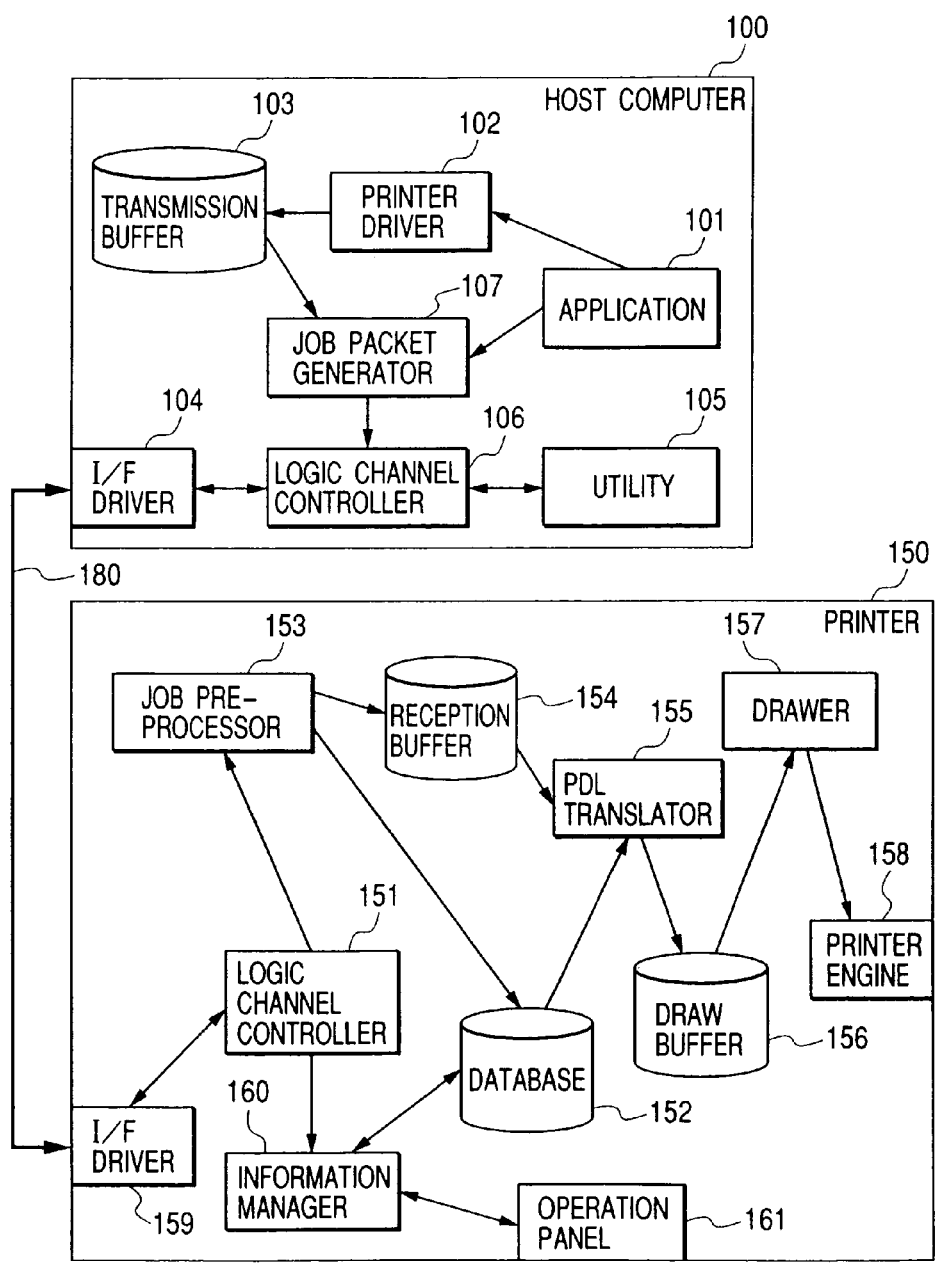
FIG. 1 is a block diagram showing a functional construction of a print system embodying a mechanism for transmitting a print job from a host computer to a printer, obtaining information of the printer, and setting an environment thereof.
Figure 2:
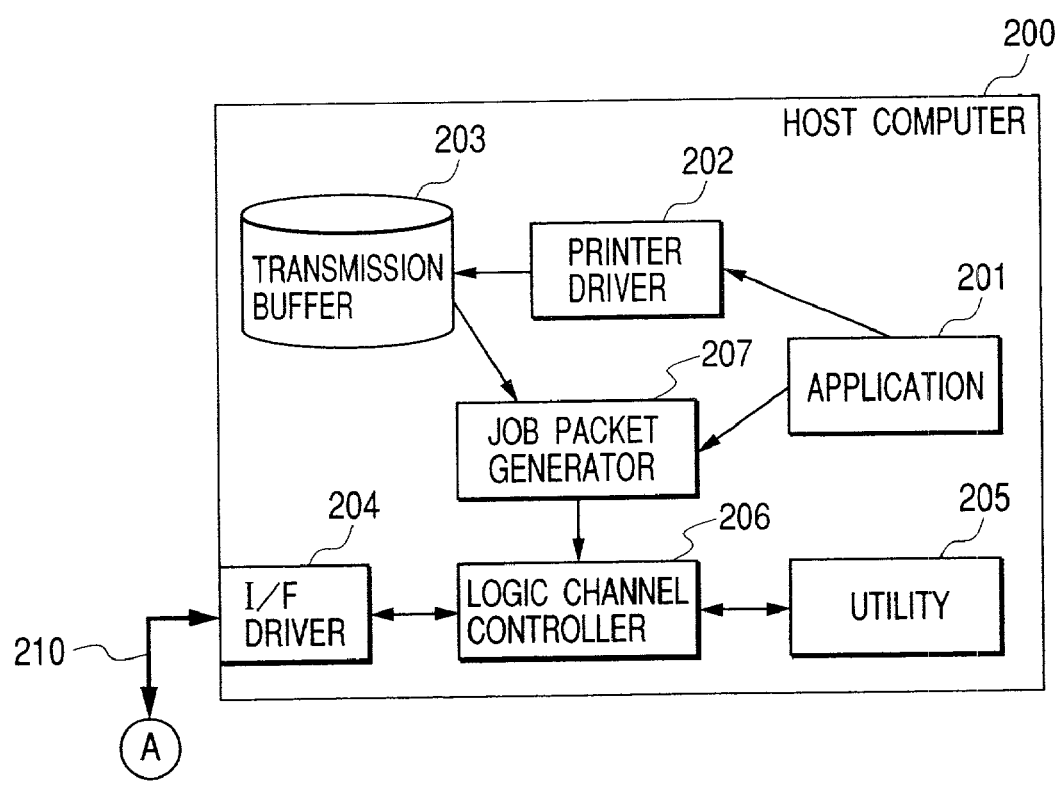
FIG. 2 is a block diagram showing a functional construction of the host computer of the print system in the embodiment.
Figure 3:
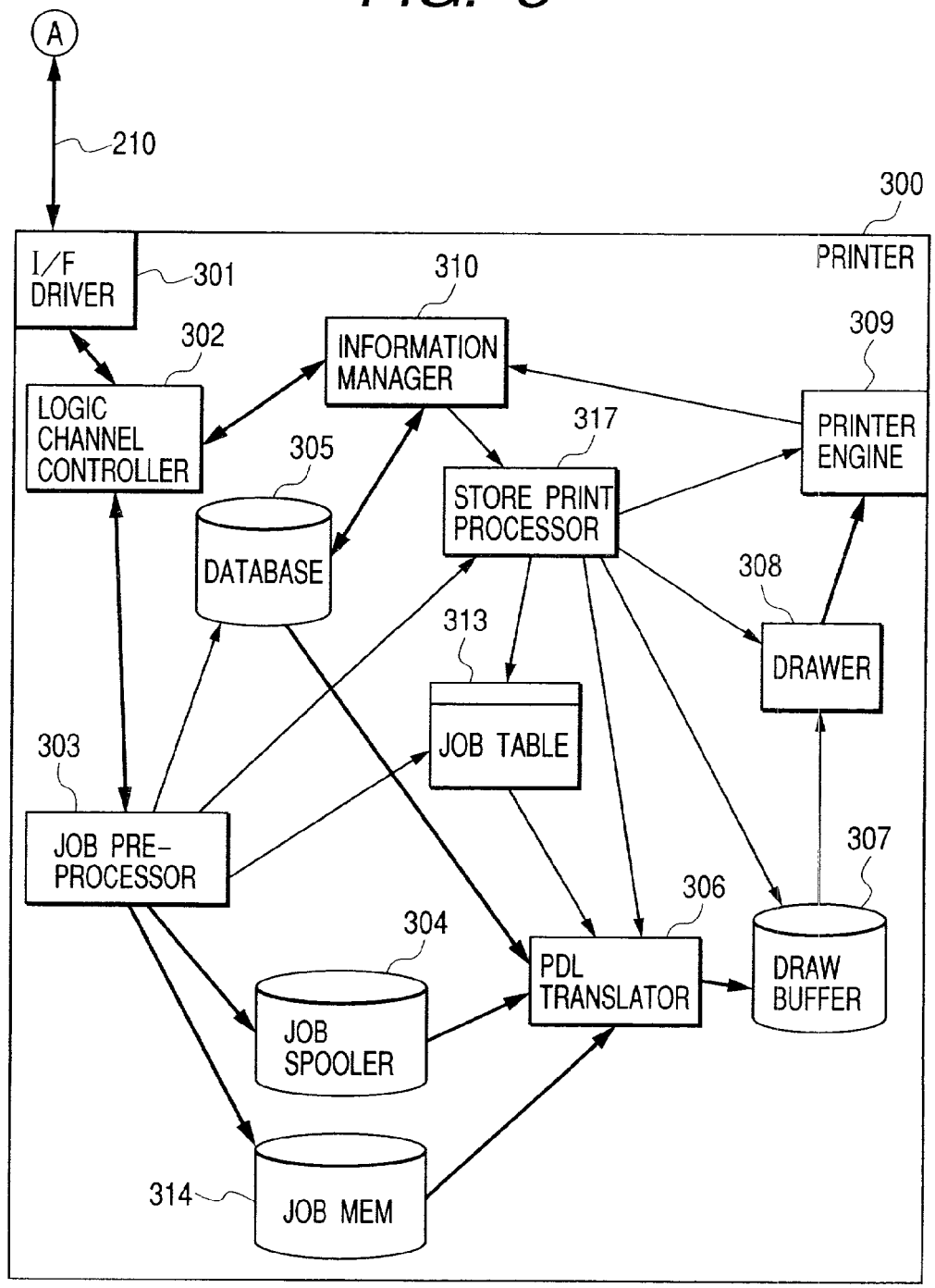
FIG. 3 is a block diagram showing a functional construction of the host computer of the print system in the embodiment.

FIGS. 2 and 3 show a print system of an embodiment and are block diagrams showing a functional construction of the print system embodying a mechanism for transmitting a print job from a host computer to a printer, obtaining information of the printer, and setting an environment thereof.

The print system comprises: a host computer 200 for forming a print job; a printer 300 for actually printing an image onto a paper on the basis of the print job; and an interface 210 for connecting the host computer 200 and printer 300. As an interface 210, either a local interface specified by IEEE1284 or a network interface such as EtherNet can be used. Explanation in case of the local interface will be made here.

Functional Construction of Host Computer

In FIG. 2, the host computer 200 comprises: an application 201; a printer driver 202; a transmission buffer 203; an I/F driver 204; a utility 205; a logic channel controller 206; and a job packet generator 207.

When the user operates a graphic user interface, the application 201 forms desired image data in accordance with the operation. The printer driver 202 converts the image data formed by the application 201 into a page description language (hereinafter, abbreviated to PDL) data which can be printed by the printer 300. The transmission buffer 203 temporarily stores the PDL data formed by the printer driver 202. The job packet generator 207 generates a predetermined job packet from the PDL data stored in the transmission buffer 203 and job information which the application 201 has.

The utility 205 enables the user to perform the following operations by using the graphical user interface: namely, a confirmation of a status of the printer 300; a confirmation of a print status of the transmitted print job; a cancellation of the print job; an interruption of the print job; a stop of the printing of the print job; a restart of the printing of the print job; and the like. The utility 205 forms a management packet which can be interpreted by the printer 300 in accordance with those operations.

The logic channel controller 206 allocates the job packet and the management packet to different channels, thereby multiplexing a transport layer in the OSI 7 layer. The I/F driver 204 bidirectionally converts the input data into logic data and an electric signal and performs the transmission and reception to/from the interface 210.

Functional Construction of the Printer

In FIG. 3, the printer 300 comprises: an i/F driver 301; a logic channel controller 302; a job pre-processor 303; a job spooler 304; a database 305; a PDL translator 306; a draw buffer 307; a drawer 308; a printer engine 309; an information manager 310; an interrupt processor 312; and a job table 313.

The I/F driver 301 bidirectionally converts the input data into logic data and an electric signal and performs the transmission and reception to/from the interface 210. The logic channel controller 302 distributes the job packet and the management packet to different channels, thereby multiplexing the transport layer in the OSI 7 layer. The job pre-processor 303 receives the job packet, analyzes it, and distributes and stores the job information of the print job into the database 305 and the PDL data into the job spooler 304.

The job spooler 304 comprises a memory device of a large capacity such as HDD (Hard Disk Drive), flash memory, DRAM (Dynamic Random Access Memory), or the like and temporarily holds the PDL data of the print job until the end of the printing. When the completion of the paper ejection of the last one page of the print job is detected, the PDL data of the relevant print job stored in the job spooler 304 is deleted or invalidated.

A processing order of the print jobs is described in the job table 313. The PDL translator 306 selects the print job in the processing order described in the job table 313, analyzes the job information of the print job stored in the database 305 and the PDL data of the print job stored in the job spooler 304, forms intermediate data which can be draw-processed in a real-time manner (this operation is called "translate"), and stores the intermediate data into the draw buffer 307.

The draw buffer 307 temporarily holds the intermediate data page by page until the completion of the printing. The drawer 308 obtains the intermediate data from the draw buffer 307, performs the rendering of the intermediate data in a real-time manner in association with a paper conveying process which is executed by the printer engine 309, and transmits the video data to the printer engine 309. The printer engine 309 physically prints an image onto a paper on the basis of the video data transmitted from the drawer 308 by using the well-known electrophotographic technique.

The information manager 310 receives the management packet transmitted from the host computer 200, obtains the information from the database 305 in response to a request, and processes the following operations: namely, a designation of a cancellation of the print job (cancelling request); a designation of an interruption (interrupting request); a designation of the stop of the printing (print stopping request); a designation of the restart of the printing (print restarting request); a designation of the preferential printing (preferential printing request); and a designation of the storage (storing request). The information manager 310 detects the end of the job or an abnormality of the apparatus and issues a management packet for autonomously notifying the host computer 200 of the detection result.

When the printing of the print job whose storage (hereinafter, also referred to as "store") has been designated (this print job is referred to as "store print job") is designated, a store print processor 317 performs a printing process of the actual store print job.

As for a data communication which is performed between the logic channel controller 206 of the host computer 200 and the logic channel controller 302 of the printer, the transport layer level is multiplexed by a specific protocol such as TCP/IP in case of the network, IEEE 1284/IEEE 1284.4 in case of the local network, or the like. The detailed description is omitted here.

The job pre-processor 303 receives the job packet which is logically transmitted from the job packet generator 207. A logical path along which the job packet flows is called a job channel. The management packet is transmitted and received between the utility 205 and information manager 310. A logical path along which the management packet flows is called a management channel. Although it has been specified that both channels can perform a bidirectional communication, the job channel can be also constructed so that it performs a unidirectional communication from the host computer to the printer in the embodiment. The job channel and the management channel have been multiplexed at the transport layer level in the OSI 7 layer and the flow process of one channel does not exert an influence on the other channel.

Structure of the Packet

Structures of the job packet and the management packet will now be described. The job packet and the management packet have been specified by a protocol of the application layer and have a packet structure constructed by a header section and a data section (also referred to as a parameter section). One print job is constructed by a plurality of job packets. A set of a series of job packets constructing the print job is called a job script.

FIG. 4 is an explanatory diagram showing a structure of the job packet. An axis of ordinate indicates the byte and an axis of abscissa indicates the bit of each byte. In the diagram, an operation code of the 0th to 1st bytes is an ID of a length of 2 bytes (16 bits) showing the function of the packet. The job packet can have the following values.

0x0201: job starting operation
0x0202: job attribute setting operation
0x0204: PDL data transmitting operation
0x0205: job ending operation In the case where the transmission side which transmitted the job packet requests a reply (reply request), the block number of the 2nd to 3rd bytes is the number which is used to show to which reply request on the transmission side the reply from the reception side corresponds. For example, it is assumed that when the host computer 200 has continuously transmitted the job packets of the block Nos. =1, 2, and 3, an error packet of the block No. =2 is returned. In this case, the host computer can specify that an error occurred in the job packet transmitted at the second time.

A parameter length of the 4th to 5th bytes denotes an area indicative of a byte length of the data section and can show up to 0 to 64 kbytes.

The 6th to 7th bytes denote an area in which the bits indicative of various flags of the job packet are stored and the following values are shown.

Error flag: When this value is equal to 1, it means that some error occurred in the printer. This flag is added to a reply packet which is sent from the printer 300 to the host computer 200.

Notice flag: When this value is equal to 1, it means that the notice is not a reply to the request packet from the host computer 200 to the printer 300 but the printer 300 notifies the host computer 200 of the fact that there is some notice item.

Continuation flag: When this value is equal to 1, it means that since all of the data was not inserted in the data section, the remaining data is sent by the next job packet. For the next job packet, the same operation code and block number as those of the previous packet have to be set.

Reply request flag: It is set to 1 when the host computer 200 requests the reply packet for the request packet to the printer 300. When it is equal to 0, no reply packet is returned in the case where the request packet was normally processed. In the case where an error occurred in the printer, a reply packet in which the error flag is set to 1 is always transmitted irrespective of 0/1 of the reply request.

The user ID of the 8th to 9th bytes and the password of the 10th to 11th bytes denote areas which are used for authentication when a limitation for security purpose is provided for the operation which can be performed by the packet.

The 12th and subsequent bytes denote a data section into which additional data corresponding to the operation code is stored. In case of the job starting operation, an executing mode (operation mode) of the job is described as additional data. There are the following operation mode codes which can be designated.

0x01: Normal execution of the print job. This print job is added as a normal print job to the end in the queue of the printer. The printing process is executed when the scheduling comes.

0x03: Storage (store) of the print job. This print job is handled as a store print job, the printing of this print job is not performed, and the print data of the print job is stored into a job memory 314.

Printer Driver

Figure 12:
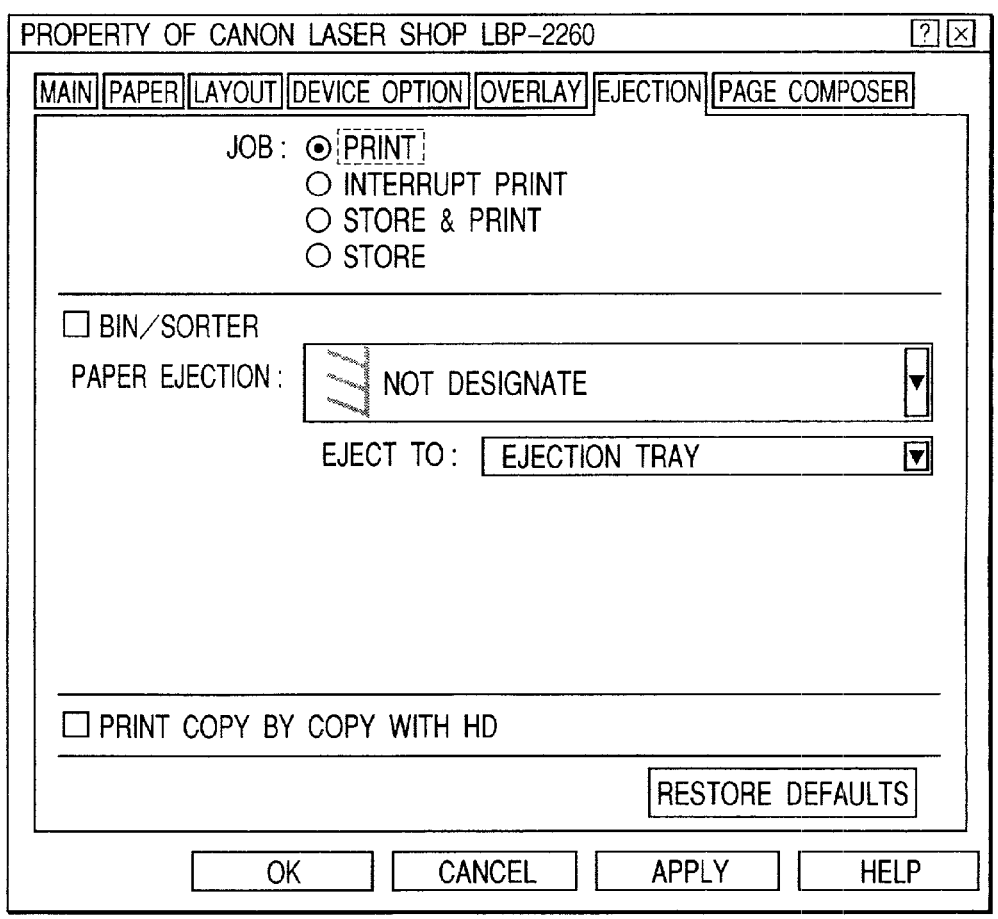
FIG. 12 is a diagram showing a graphic user interface which is provided to allow the user to instruct a desired processing method (executing mode of a job)

FIG. 12 is a diagram showing a graphic user interface which is provided by the printer driver 202 in order to allow the user to instruct a desired processing method (executing mode of the job). In a picture plane of FIG. 12, in a column where "JOB" is written, there are items of "PRINT", "INTERRUPT PRINT", "STORE & PRINT", and "STORE" and check buttons for those items. The check buttons are exclusively selected. When any of the buttons is checked, the check of the other button is cancelled. When the check button of "PRINT" is marked, the executing mode is set to 0x01. When the check button of "INTERRUPT PRINT" is marked, the executing mode is set to 0x04.

When the check button of "STORE" is marked, the executing mode is set to 0x03.

Job Attribute

In case of the job attribute setting operation, a job attribute ID and the job attribute value which the user wants to set are stored as additional data into the data section. The job attribute ID indicates an attribute regarding the job or an identifier corresponding to an environment. The ID corresponding to the attribute of the job specified by ISO-10175 (DPA) has previously been allocated. There are the following typical job attributes.

Job attribute: ID
0x0101: Job name
0x0103: Job owner name
0x016a: Job size
0x0002: Notice address of job end Besides them, the corresponding IDs are allocated to job attributes such as the number of copies to be printed, monochromatic/color, and the like in accordance with the function of the printer.

In case of the PDL data transmitting operation, the PDL data is inputted into the data section as additional data. The data of one job packet can be stored up to the maximum size at which it can be stored in the parameter length, namely, up to 64 kbytes. The data more than that is divided into a plurality of job packets having the PDL data transmitting operation and transmitted. In this case, "1" is set to the continuation flag.

No additional data exists in case of the job ending operation.

Job Packet Generator

Figure 5:
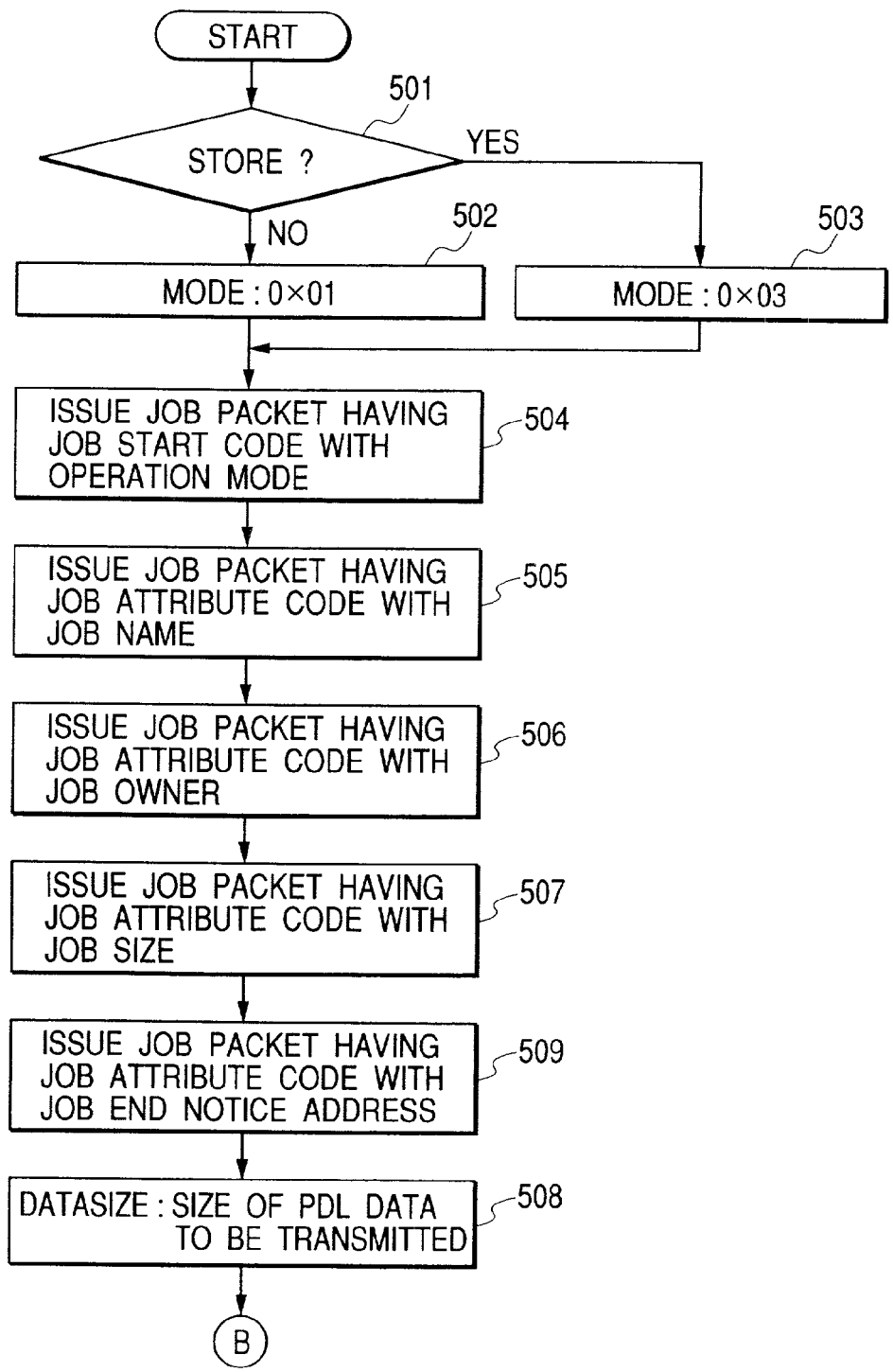
FIG. 5 is a flowchart showing the operation of a job packet generator.
Figure 6:
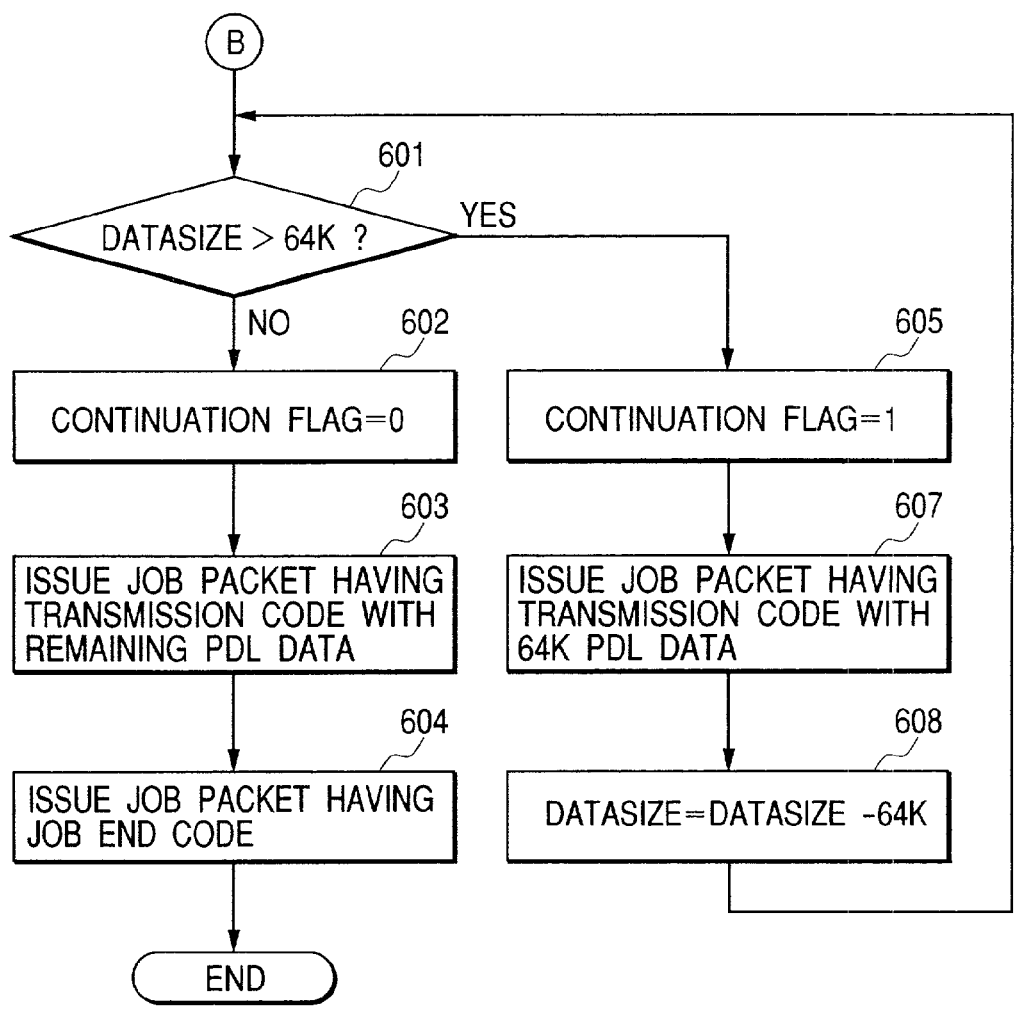
FIG. 6 is a flowchart for explaining the operation of the job packet generator.

The job packet generator 207 of the host computer will now be described. FIGS. 5 and 6 are flowcharts showing the operation of the job packet generator 207. When a print instruction is selected by the application 201, the printer driver 202 is first activated. After the printer driver 202 finished the storage of the print data into the transmission buffer 203, the job packet generator 207 starts the process.

First, in step 501, whether the relevant print job has been store designated or not is discriminated. The store designation is performed when the user designates the storage of the print job by operating a property screen of the user interface of the printer driver 202. When there is the store designation, the operation mode is set to 0x03 in step 503. When there is not the store designation, the operation mode is set to 0x01 in step 502.

Subsequently, in step 504, a job packet in which a job starting operation code (=0x0201) has been stored in the area where the operation codes have been stored is issued to the logic channel controller 206. In this instance, a value indicative of the operation mode is set into the data section of the job packet. Whether it indicates the normal job or the store print job is designated.

After that, all of the operations are used for setting the job information of the relevant print job until the job ending operation is issued.

The name of the job is set in step 505. The job attribute setting operation code (0x0202) is stored into the area where the operation codes are stored, the job attribute ID (=0x0101) indicative of the job name and the name serving as a job attribute value are stored in the data section, and a job packet is formed. This job packet is issued to the logic channel controller 206.

In step 506, the owner of the job is set. The job attribute setting operation code (0x0202) is stored into the area in FIG. 4 where the operation codes are stored, the job attribute ID (=0x0103) indicative of the job owner and the owner name serving as a job attribute value are stored in the data section, and a job packet is formed. This job packet is issued to the logic channel controller 206.

In step 507, the size of job is set. The job attribute setting operation code (0x0202) is stored into the area in FIG. 4 where the operation codes are stored, the job attribute ID (=0x016a) indicative of the job size and the data size of the job serving as a job attribute value are stored in the data section, and a job packet is formed. This job packet is issued to the logic channel controller 206.

In step 509, an address of a notice destination (notice address) in case of notifying the host computer of the job completion of the print job is set. The job completion denotes that the paper ejection of the last one page of the print job has been completed. The job attribute setting operation code (0x0202) is stored into the area in FIG. 4 where the operation codes are stored, the job attribute ID (=0x0002) indicative of the notice destination address and the notice destination address of the job completion serving as a job attribute value are stored in the data section, and a job packet is formed. This job packet is issued to the logic channel controller 206.

The notice address generally indicates a transmission address of the host computer which transmitted the print job. In the case where the transmitting source is a local interface using IEEE 1284.4 and a socket ID is equal to 0x10, a character train of "184.4:0x20" is displayed. In the case where the transmitting source is TCP/IP, an IP address is equal to 172.16.1.1, and the port No. is equal to 0xb9b9, a character train of "TCP/IP:172.16.1.1:0xb9b9" is displayed.

In step 508, a byte size of PDL data to be transmitted is substituted for DATASIZE.

In step 601, a size of DATASIZE is checked to see if it is larger than 64 kbytes. Since a parameter length of packet header is expressed by 16 bits, a size of data which can be stored in the data section of one job packet is limited to up to 64 kbytes. Therefore, the data larger than it is divided into a plurality of job packets and issued.

If the size of PDL data is larger than 64 kbytes, the continuation flag of the packet header in FIG. 5 is set to 1 in step 605. Further, in step 607, the PDL data transmitting operation code (0x0204) is stored into the area in FIG. 5 where the operation codes are stored, the PDL data of 64 kbytes is extracted from the transmission buffer 203 and stored into the data section, and a job packet is formed. The job packet is issued to the logic channel controller 206. In step 608, the transmitted data of 64 kbytes is subtracted from DATASIZE. The processing routine is returned to step 601.

In step 601, when DATASIZE showing the size of PDL data is equal to or less than 64 kbytes, the transmission of the whole PDL data is completed by the job packet having the PDL data transmission operation code of subsequent one time. In this case, in step 602, the continuation flag of the packet header in FIG. 4 is set to 0, thereby setting that the transmission of the PDL data is the last transmission. Further, in step 603, the PDL data transmitting operation code (0x0204) is stored into the area in FIG. 4 where the operation codes are stored, all of the remaining PDL data is extracted from the transmission buffer 203 and stored into the data section, and a job packet is formed. The job packet is issued to the logic channel controller 206.

Finally, in step 604, the job ending operation code (0x0205) is stored into the area in FIG. 4 where the operation codes are stored, and a job packet is formed. The job packet is issued to the logic channel controller 206. The process is finished.

Job Pre-Processor

The job pre-processor 303 for receiving the job packet will now be described.

Figure 7:
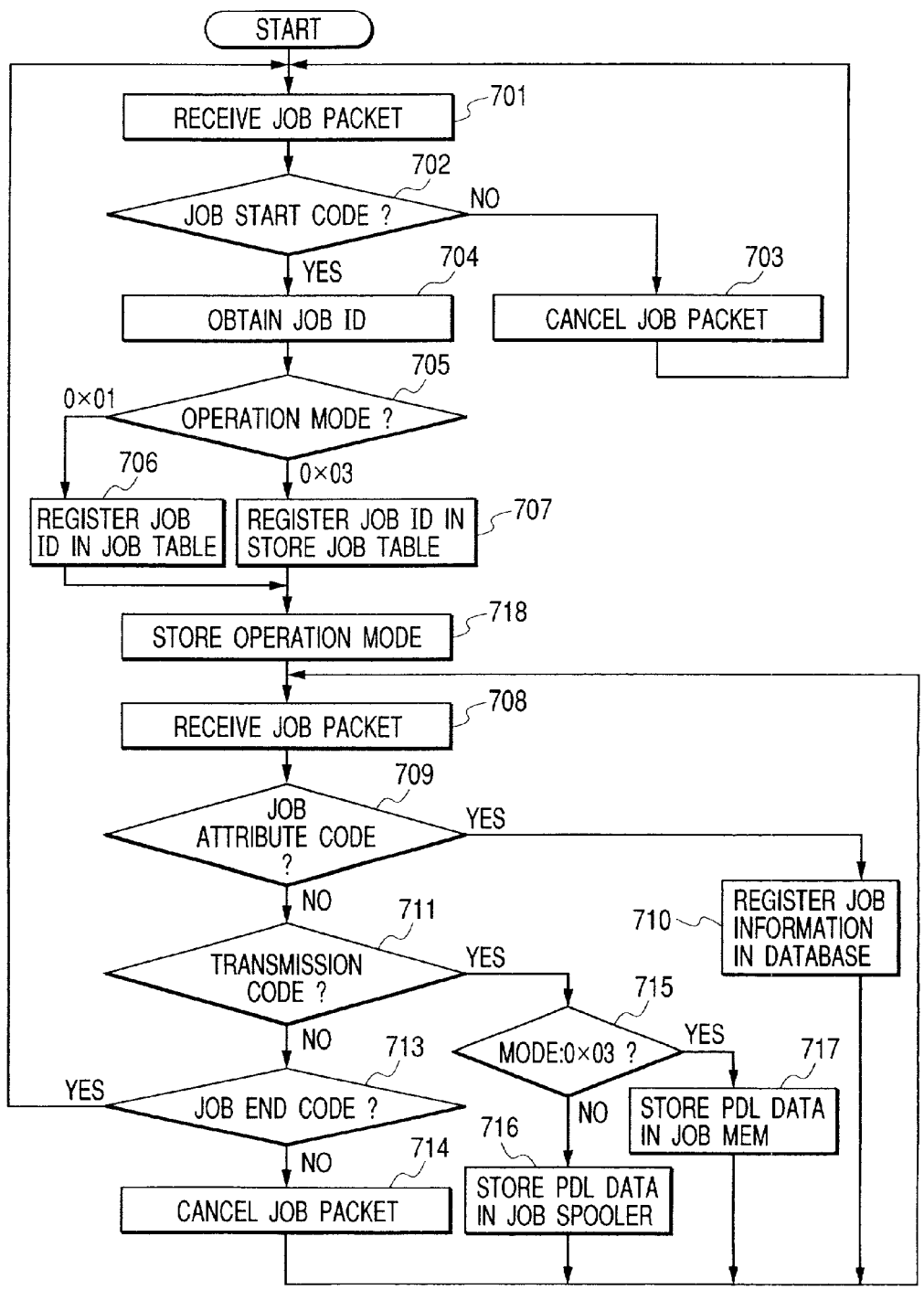
FIG. 7 is a flowchart for explaining the operation of a job pre-processor 303.

FIG. 7 is a flowchart showing the operation of the job pre-processor 303. In FIG. 7, the job pre-processor 303 is activated upon activation of the printer 300 and, thereafter, continues the processes until a power source of the printer 300 is turned off.

First, in step 701, the job packet is received. When the job packet is received, whether the operation code of the job packet is the job starting operation code or not is discriminated in step 702. When the job packet having the operation code other than the job starting operation code arrives, it means the illegal operation. In step 703, this job packet is cancelled.

When it is determined that the operation code of the job packet is the job starting operation code, the job ID of the relevant print job is obtained in step 704. The job ID is issued in the printer 300, is allocated as a number of 2 bytes, and used as a key for the reading/writing process of the job information in the database 305.

In next step 705, the operation mode code stored in the data section of the job packet is examined, thereby discriminating to which mode the operation mode has been set.

In case of 0x01, in step 706, the job ID of the relevant print job is registered (added) into the job table 313, which will be explained hereinlater. In this instance, this print job is added to the last in a job table, which will be explained hereinlater.

In case of 0x03, in step 707, the job ID of the print job is registered into the store job table stored in the job memory 314. The store job table has been stored in the job memory 314. In this instance, a count value of a store counter is increased by 1. The store counter is counted up when the store job increases. When the power source of the printer is turned on, various initializing processes of the printer are executed. It is assumed that the count value of the store counter is initialized to "0" at the time of the initializing process.

The operation mode is stored in memory means such as an RAM or the like in step 718.

In step 708, subsequently, the job packet which arrives next is received.

In step 709, whether the operation code of the job packet which is received next is the attribute setting operation code or not is discriminated. When it is the attribute setting operation code, it is registered as job information of the relevant print job into the database 305 in step 710. The job ID obtained in step 704 and the attribute ID and attribute data (attribute value) stored in the data section of the job packet become keys in this instance.

When the attribute setting (registration of the job information) is completed, the processing routine is returned to step 708 in order to receive the next job packet.

In step 711, whether the operation code of the received job packet is the PDL data transmitting operation code or not is discriminated. When it is the PDL data transmitting operation code, whether the operation mode stored in step 718 is 0x03 or not is discriminated in step 715. If the operation mode is not equal to 0x03, the PDL data is stored in the job spooler 304 in step 716. At this time, the PDL data is stored by using the job ID obtained in step 704 as a key, thereby enabling the PDL data to be easily extracted later by using the job ID as a key.

In the job spooler 304, the PDL data is stored while the job ID and the PDL data are made to correspond to each other. After completion of the addition into the job spooler 304, the processing routine is returned to step 708 in order to receive the next job packet.

When the operation mode is equal to 0x03, the PDL data of the relevant print job is stored in the job memory 314 in step 717. In this instance, the PDL data is stored by using the job ID obtained in step 704 as a key, thereby enabling the PDL data to be easily extracted later by using the job ID as a key. The PDL data is stored in the job spooler 304 while the job ID and the PDL data are made to correspond to each other.

At this time, when the storage of the PDL data fails because of a shortage of memory capacity of the job memory 314 or the like, the information manager 310 forms an event packet indicative of the failure of the storage and transmits it to the host computer 200. This event packet is a management packet. 0x00a is stored in the area where the operation codes are stored. An event code indicative of the kind of event is stored in the data section. The event code showing the failure of the storage is 0x00da. Further, after that, the job ID of the print job in which the storage failed is added. When this event packet is received, the utility 205 of the host computer 200 notifies the user of the occurrence of the storage failure by displaying a dialog picture plane.

Whether the operation code of the job packet is the job ending operation code or not is discriminated in step 713. When it is the job ending operation code, the processing routine skips a series of loops and is returned to the initial mode in step 701.

When the operation code of the job packet does not correspond to any of the operation codes, the received job packet is determined to be the illegal job packet. This job packet is cancelled in step 714.

By the above operation, the job pre-processor 303 distributes the job information of the job packet to the database 305 and distributes the PDL data of the job packet to the job spooler 304 or job memory 314.

Job End Notice

Figure 14:
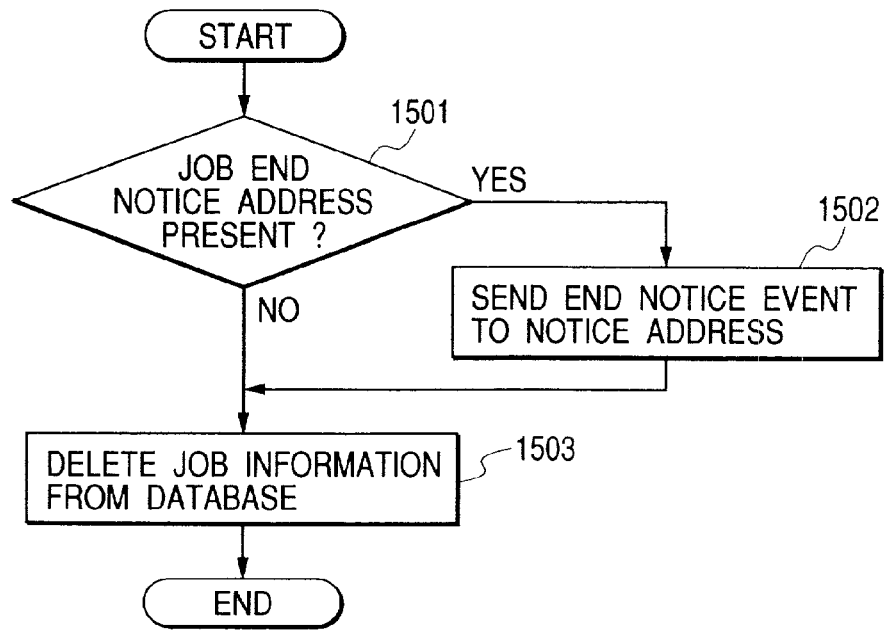
FIG. 14 is a flowchart showing processes when a job end is notified.

The job end notice which is performed by the information manager 310 will now be described. FIG. 14 is a flowchart showing the operation of the job end process which is performed by the information manager 310. First, in step 1501, with respect to the print job in which the ejection of the last page has been completed, the job attribute of the print job in the database 305 is examined, thereby discriminating whether the job end notice address has been set or not.

Usually, since the job packet generator 207 has generated the job packet having the notice address in step 509 in FIG. 5, a discrimination result in step 1501 is YES. Thus, an end notice event is transmitted to the notice address in step 1502. The end notice event has a packet structure as shown in FIG. 4 in a manner similar to the job packet. However, the operation code of the end notice event is 0x000a and the bit of the notice flag and the bit of the reply transmission are set to 1. The event ID (=0x0008) indicative of the end of job and the bin number of the paper ejection bin to which the paper has been ejected in the case where the printer 300 has a plurality of paper ejection bins are stored in the data section.

Figure 15:
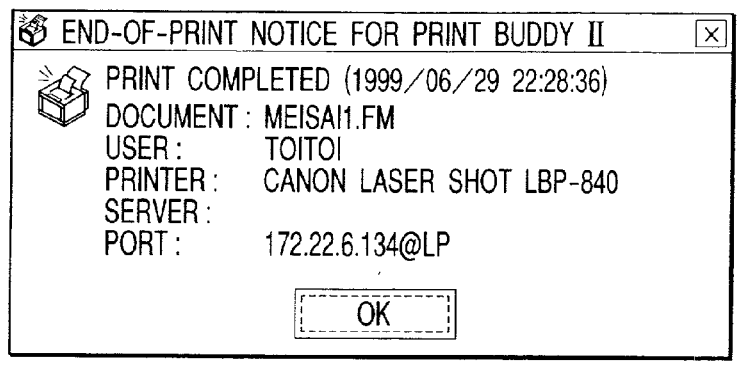
FIG. 15 is a diagram showing a user interface for displaying an end-of-print notice.

When the end notice event is received, the utility 205 displays a pop-up dialog, thereby informing the user of the completion of the printing process of the print job by using the graphic user interface. FIG. 15 shows an example of such a pop-up dialog.

Utility

The utility 205 will now be described. The utility 205 is used for the user to perform the operation such as display of the list and attributes of the print jobs, cancellation of the print job, print designation of the store print job, or the like.

The operation executed by the utility 205 is realized when the management packet is transmitted or received between the host computer 200 and the printer 300 via the management channel. The management packet has a data structure as shown in FIG. 4 in a manner similar to the job packet. The contents of various information of the packet header of the 0th to 11th bytes are also similar to those of the job packet except for a point that only the operation codes differ as follows.

0x010b: Cancel designation of print job
0x0123: Interrupt designation of print job
0x010d: Obtaining of list of print jobs
0x0120: Stop designation of print job
0x0121: Restart designation of print job
0x0022: Promote designation of print job
0x0044: Print designation of store print job
0x0105: Setting of attribute
0x0106: Obtaining of attribute
0x0110: Stop designation of printer
0x011: Recovery designation of printer
0x011a: Reset designation of printer Unlike the job packet, as for the management packet, each packet is used for a unique purpose.

When the print job is transmitted in a form of the job packet to the printer 300, in the printer 300, the job ID and the job information are stored in the database 305 by the operation of the job pre-processor 303.

When the utility 205 wants to know which print job has been inputted to the printer 300, the management packet having the operation code (0x010d) for obtaining the list of the print jobs is transmitted to the management channel. The object ID=0x0102 indicative of the print job class as an object to be obtained is stored in the data section. This management packet is sent to the information manager 310 via the logic channel controller 206, I/F driver 204, interface 210, I/F driver 301, and logic channel controller 302.

The information manager 310 recognizes that the operation code indicates the code for obtaining the list of print jobs from the operation code of the received management packet, obtains the list information of the print jobs stored in the database 305, and returns the reply packet in which the list information has been stored. The number of print jobs recognized by the printer 300 and the list of job IDs of the print jobs have been stored in the data section of the reply packet.

When each print job has information of the job name, owner, and size by the job attribute setting operation, the utility 205 can obtain the detailed information regarding the print job. Therefore, after the list of print jobs was obtained, the utility 205 transmits the management packet having the operation code (=0x0106) for obtaining the attribute to the printer 300. The job ID of the print job to be obtained and the attribute ID of the attribute to be obtained are designated in the data section of the management packet. For example, when the user wants to obtain the job name of the print job whose job ID is equal to 1, 1 is designated as a job ID and 0x0101 is designated as an attribute ID.

The information manager 310 recognizes that the operation code is the code for obtaining the attribute from the operation code of the received management packet, obtains the attribute values of the designated attribute ID of the designated job ID from the database 305, and returns the reply packet in which those values have been stored.

Job List

Figure 13:
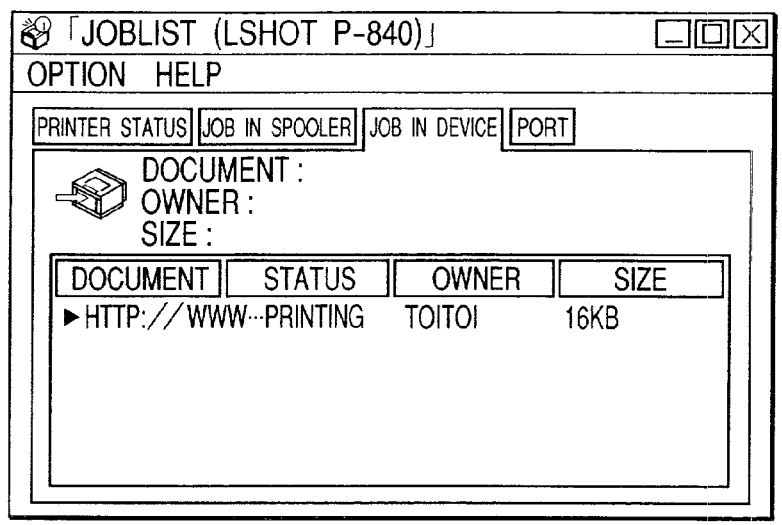
FIG. 13 is a diagram showing an example of a user interface for displaying a job list.

FIG. 13 is a diagram showing a user interface for displaying the job list in the utility 205. The job list in the printer of the printer name "LSHOT P-840" is displayed in FIG. 13. Only one print job exists in the printer.

The utility 205 issues the management packet having the operation code for obtaining the list of print jobs and obtains the list of print jobs. The utility further issues the management packet having the operation code for obtaining the attribute of each print job in the list of the print jobs, obtains the attribute of each print job, and displays an image on the basis of the obtained information.

FIG. 13 shows a state where there is one print job having the job name "http://www . . . ", this print job is at present being printed, the owner name is "toitoi", and the size is equal to 16 kbytes.

The user can perform an additional operation in the user interface of FIG. 13. The user moves a cursor to a column of a desired print job displayed on the screen by using a mouse and clicks the right button of the mouse. Thus, a selecting picture plane of "cancel of print job", "interrupt print of print job", "print stop of print job", "restart print of print job", and "preferential print of print job" is displayed as an additional menu. The user can select any of them.

When the user selects "cancel of print job", the management packet which has the operation code for designing the cancellation of the print job and in which the job ID of the print job has been stored in the data section is formed and transmitted toward the printer 300.

When the user selects "interrupt print of print job", the management packet in which the operation code (=0x0123) for the interrupt designation of print job has been stored is transmitted to the printer 300. The job ID of the interrupt designated print job is stored in the data section of the management packet.

When the user selects "print stop of print job", the management packet in which the operation code (=0x0120) for the stop designation of print job has been stored is transmitted to the printer 300. The job ID of the stop instructed print job is stored in the data section of the management packet.

When the user selects "restart print of print job", the management packet in which the operation code (=0x0121) for the restart designation of print job has been stored is transmitted to the printer 300. The job ID of the restart instructed print job is stored in the data section of the management packet.

When the user selects "preferential print of print job", the management packet in which the operation code (=0x0022) for the promote designation of print job has been stored is transmitted to the printer 300. The job ID of the preferential print instructed print job is stored in the data section of the management packet.

Job Table

Figure 8:
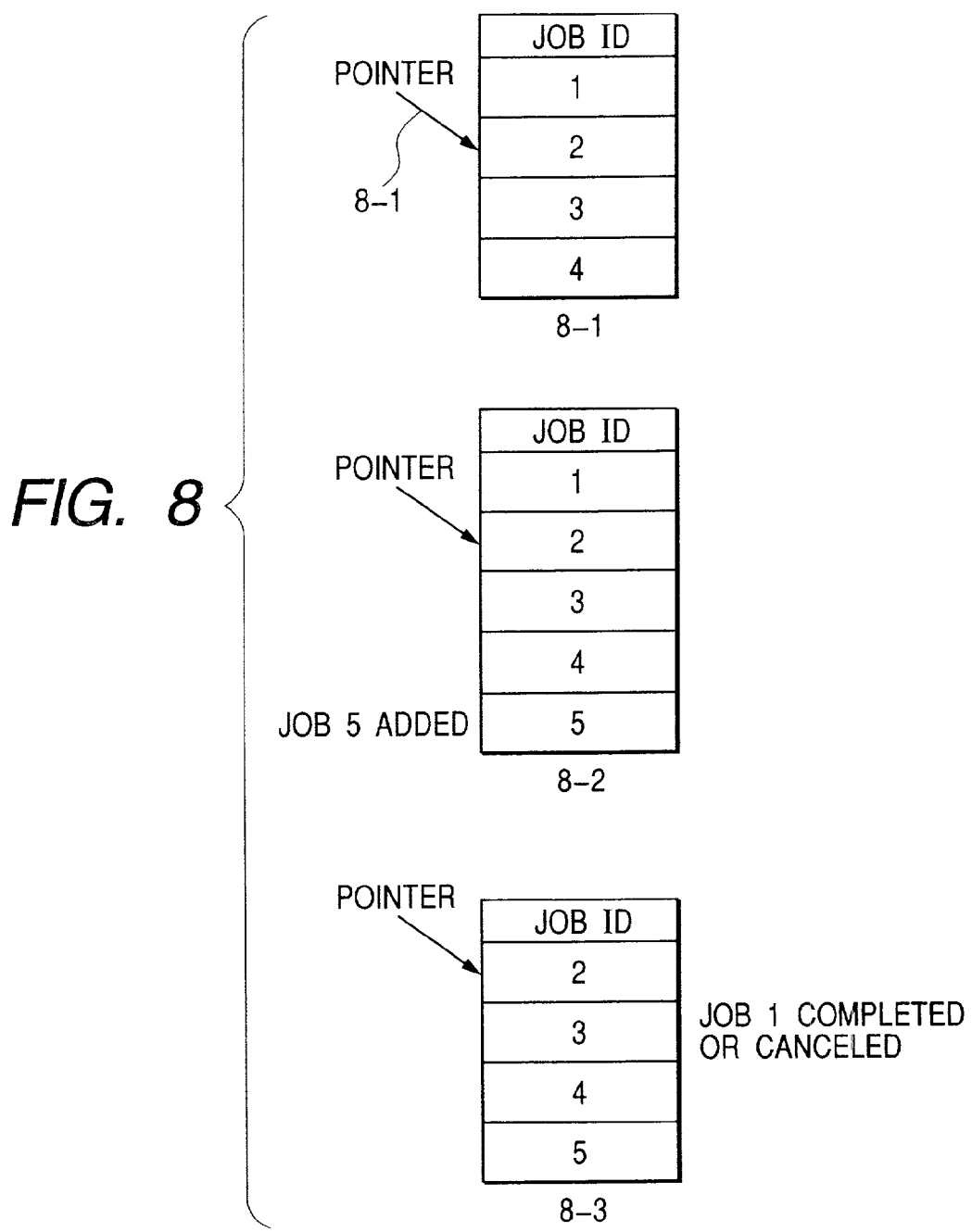
FIG. 8 is an explanatory diagram showing a job table.

The job table 313 will now be described. FIG. 8 is an explanatory diagram showing a job table. The PDL translator 306 selects the print jobs in processing order described in the job table 313 and translate processes the PDL data of the selected print job.

Print jobs of the job IDs 1 to 4 have been registered in a job table 8-1. Therefore, when the translation is executed, the PDL translator 306 selects the print jobs in order from the top in the job table such as print job of the job ID 1, print job of the job ID 2, print job of the job ID 3, and print job of the job ID 4 and translates the PDL data of those print jobs.

When the job pre-processor 303 adds the print job having the job ID 5 into the job table 313, the print job having the job ID 5 is added to the last in the job table as shown in a job table 8-2.

When the printer engine completes the ejection of the last page of the print job of the job ID 1, the print job of the job ID 1 is deleted from the job table as shown in a job table 8-3.

As mentioned above, the job table 313 is used for indicating the processing order of the print job which is processed by the PDL translator and controlling the processing order of the print job.

A pointer 801 indicates of which print job the PDL translator 306 reads out and processes the PDL data. When the PDL translator 306 finishes the translating process of all of the PDL data of a certain print job, the pointer 801 indicates the next print job of such a print job. In FIG. 8, the PDL data of the print job of the job ID 2 is read out by the PDL translator 306. When the PDL translator 306 translate processes all of the PDL data of the print job of the job ID 2, the pointer 801 indicates the print job of the job ID 3.

Store Job List

The store job table also has a structure similar to that of the job table. The store job table is used to store a list of job IDs of the store designated print jobs.

Figures 22, 23:
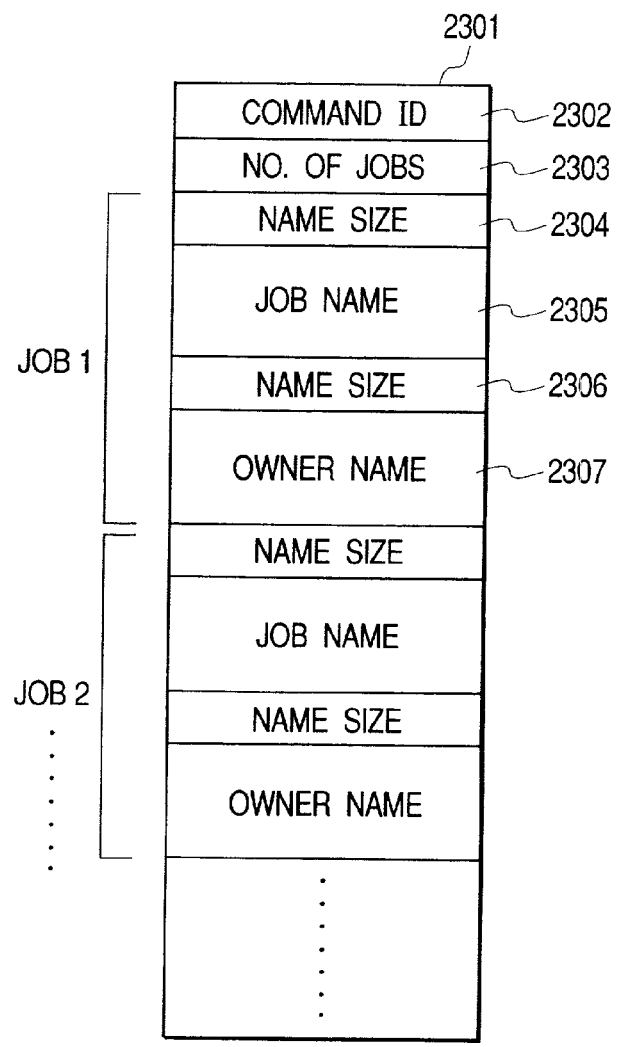
FIG. 22 is a diagram showing an example of a store print job table.
FIG. 23 is a diagram showing an example of list information of store print jobs.

FIG. 22 is a diagram showing an example of the store job table. The store job table is a table for managing the store print job (store designated job) received from the host computer. This table has been stored in a memory resource (for example, RAM 3610, NVRAM "Non-Volatile Random Access Memory" 3615) in a printer 3601. The job name, owner name, and job ID of each job have been stored in the store job table in FIG. 22.

The printing of the store print job will be described.

Figure 10:
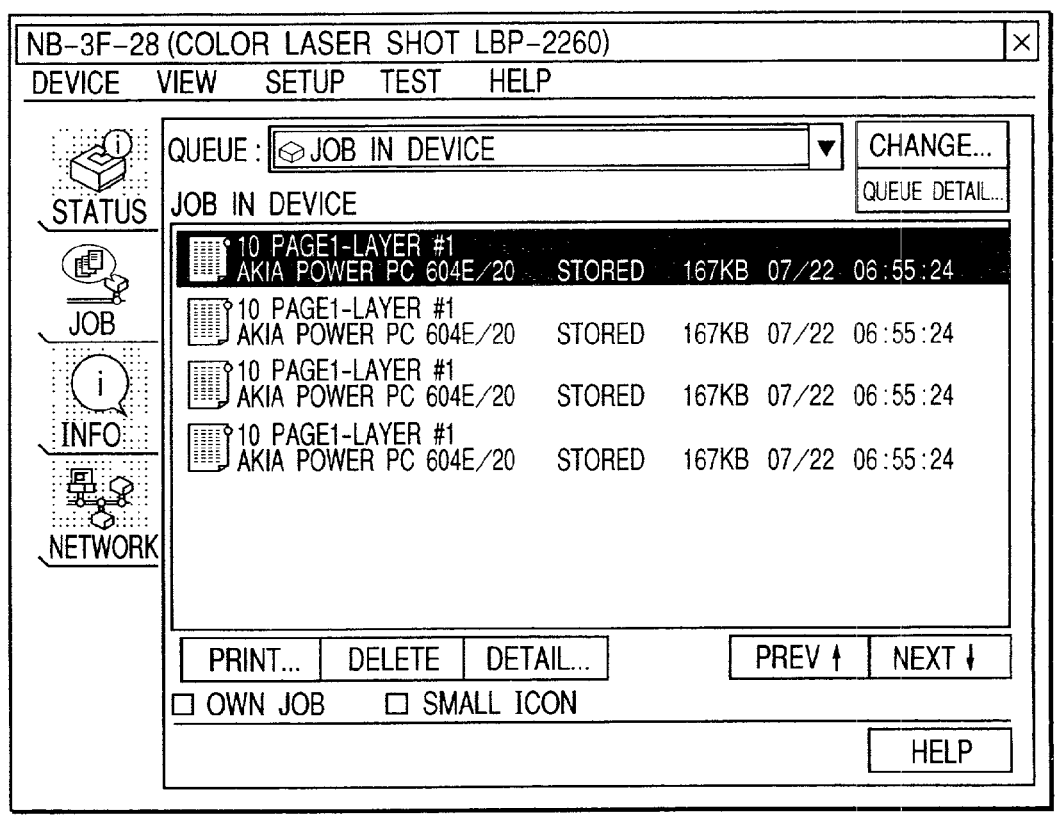
FIG. 10 is a diagram showing a user interface for displaying a job ID list of a store print job.
Figure 11:
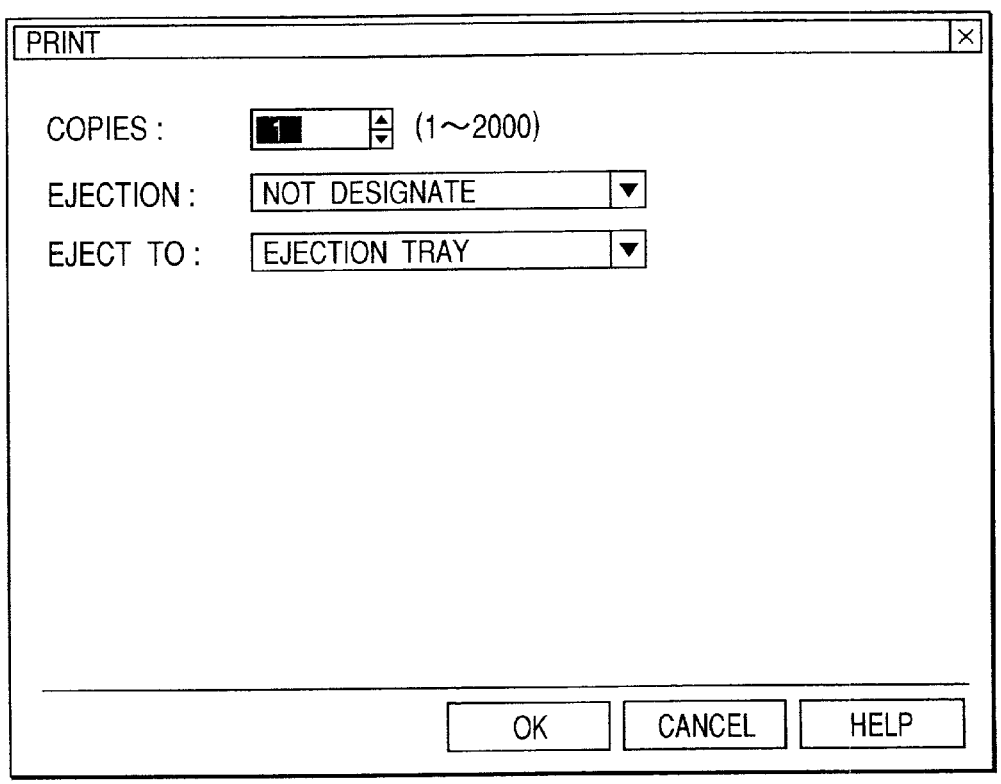
FIG. 11 is a diagram showing a user interface for attribute change which is executed at the time of print designation of the store print job.

FIGS. 10 and 11 are diagrams showing user interfaces for changing the attribute (job information) of the print job which will be print processed from now on in the case where the user print designates the store print job from the utility 205.

First, when the user selects the display of the store print job list in the utility 205, a picture plane as shown in FIG. 10 is displayed. In this instance, in order to obtain the list of the store print jobs, the utility 205 transmits the management packet having the list obtaining operation code to the printer 300. A value indicating that the list to be obtained is a list of the job IDs of the store print jobs is inputted in the data section of the management packet. Thus, the job ID registered in the store job table can be obtained. After the list of the job IDs of the store print jobs was obtained, the management packet having the operation code (=0x0106) for obtaining the attribute of each store print job is transmitted to the printer 300, and the attribute (job information) of each store print job is obtained. The list of the store print jobs existing in the printer 300 is displayed on the picture plane of FIG. 10.

The utility 205 can receive the list information of the store print jobs and display the picture plane as shown in FIG. 10 on the basis of the received information. FIG. 23 is a diagram showing an example of list information of the store print jobs.

The utility 205 transmits the management packet having the code for obtaining the list information of the store print jobs to the printer 300. When the management packet is received from the host computer, the printer 300 returns list information 2301 of the store print jobs to the host computer.

The list information 2301 of the store print jobs comprises: a command ID 2302; the number of jobs 2303; and N job information JOB1, JOB2, . . . , and JOBN. Each job information comprises: a name size 2304; a job name 2305; an owner name size 2306; and an owner name 2307. It is assumed that when the management packet having the code to obtain the store counter is received from the host computer, the printer 300 returns a count value (which is managed on the RAM 3610) of the store counter to the host computer.

Figure 25:
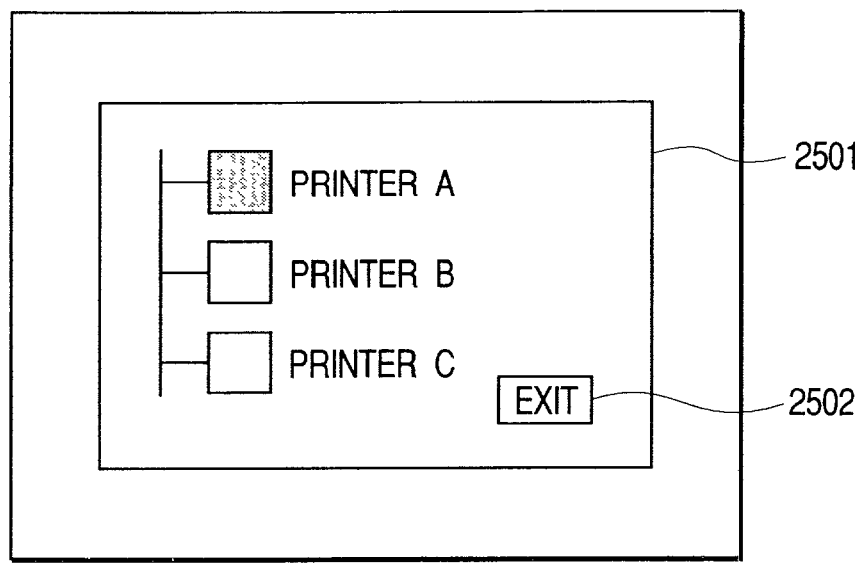
FIG. 25 is a diagram showing an example of a screen which is provided by the utility.
Figure 26:
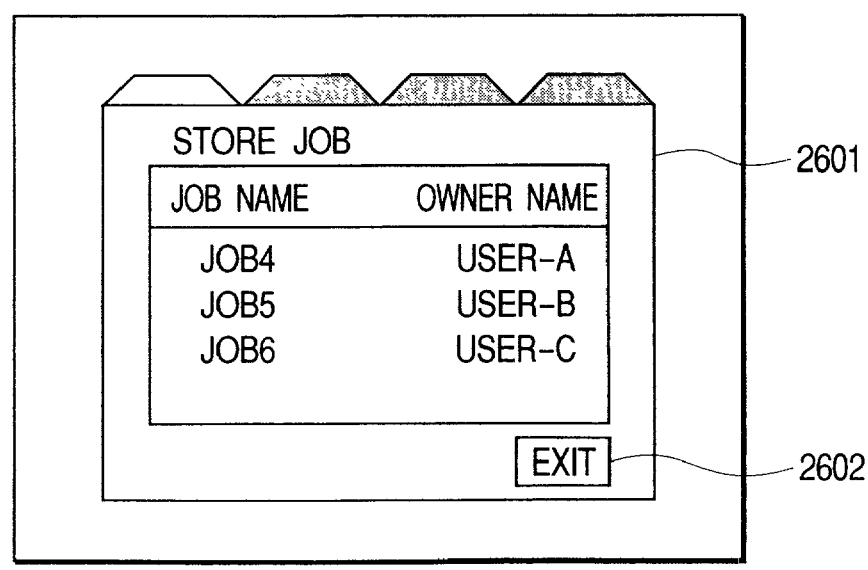
FIG. 26 is a diagram showing another example of a screen which is provided by the utility.

FIGS. 25 and 26 are diagrams showing examples of picture planes which are provided by the utility 205. These picture planes are displayed on a display apparatus (for example, CRT 3710 in FIG. 21) of the host computer.

In FIG. 25, reference numeral 2501 denotes a picture plane for allowing the user to select a specific printer. The utility 205 searches for the printer connected via the network and displays a printer name.

The user can select the specific printer by a keyboard, a pointing device, or the like. When the printer is selected, a picture plane 2601 in FIG. 26 is displayed on the display apparatus. FIG. 26 shows the picture plane for displaying a list of the store print jobs of the printer selected. The job name and owner name of the store print job stored in the printer are displayed on the picture plane 2601 for displaying the list of the store print jobs. Reference numeral 2602 denotes an end button. When the end button 2602 is selected, the picture plane of FIG. 25 is displayed again.

Figure 24:
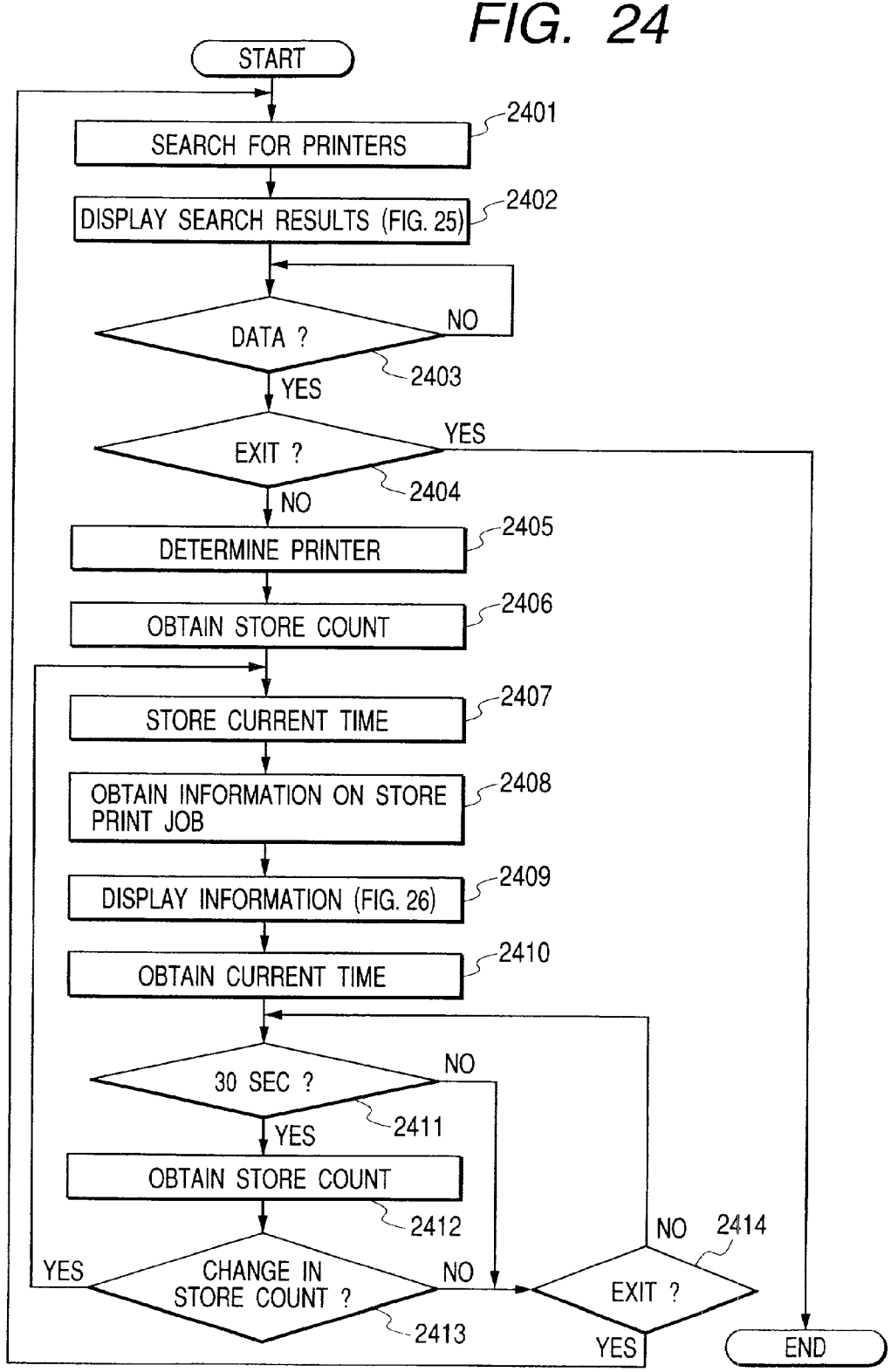
FIG. 24 is a flowchart showing a process for displaying a list of the store print jobs in a utility.

FIG. 24 is a flowchart showing a process for displaying the list of the store print jobs in the utility 205. In step 2401, the printer connected via the network is searched. In step 2402, the picture plane shown in FIG. 25 is displayed on the basis of a search result. In step 2403, the apparatus waits for an input.

For example, when there is an input from the keyboard, pointing device, or the like, step 2404 follows. In step 2404, whether the input designates the end or not is discriminated. When the input is determined to be the end designation, this process is finished.

When it is decided in step 2404 that the input indicates the selection of the printer, the selected printer is specified in step 2405. A count value of the store counter of the printer is obtained in step 2406.

In step 2407, the current time is stored into an RAM 3703. In step 2408, the information of the store print job is obtained from the selected printer. In this example, it is possible to use either a method whereby the list of the store print jobs is obtained and the attribute of each store print job is obtained after that or a method whereby the list information of the store print job is obtained. In step 2409, the picture plane shown in FIG. 26 is displayed on the basis of those information.

The current time is obtained again in step 2410. In step 2411, the time already stored in step 2407 is compared with the time obtained in step 2410, thereby discriminating whether a predetermined time (30 seconds here) has already elapsed or not. When it is determined that the time of 30 seconds does not elapse yet, the processing routine advances to step 2414.

When it is decided in step 2411 that the time of 30 seconds has already elapsed, the count value of the store counter is obtained from the selected printer in step 2412. Whether the count value of the store counter has been changed from the previous value or not is discriminated in step 2413. When it is decided that the count value has been changed, since it means that the list of the store jobs has been updated, the processing routine is returned to step 2407.

When it is decided in step 2413 that the count value is not changed, since there is no need to change the screen display of the CRT, step 2414 follows.

Whether there is an input by the keyboard or pointing device or not is discriminated in step 2414. When it is decided that there is no input, the processing routine is returned to step 2411. When it is determined in step 2414 that there is the input in step 2414 and the input indicates the end designation, the processing routine is returned to step 2401.

Thus, since the host computer does not need to obtain the information of the store print job than it is necessary, an amount of data communication between the host computer and the printer decreases. Thus, the traffic on the network and the load on the application are further reduced and the performance is improved.

FIG. 22 shows an example of the list of the job IDs of the store print jobs.

When the user selects the store print job to be print designated from the list of the store print jobs in FIG. 10 and depresses a "PRINT" button, a picture plane as shown in FIG. 11 is displayed. On the picture plane of FIG. 11, the user can change the print attribute (job information) at the time when the printing process of the store print job is executed. In the embodiment, each time the print designation of the store print job is performed, the number of copies to be printed, the paper ejecting method, or a paper ejecting unit (paper ejection destination) can be changed.

When the user depresses an "OK" button on the picture plane of FIG. 11, the management packet in which the operation code (=0x0044) for print designation of the store print job has been stored is transmitted to the printer 300. The job ID of the print designated store print job has been stored in the data section of the management packet. Further, when the user issues an instruction for attribute change of the print job simultaneously with the print designation of the store print job, the list of the attribute IDs and the attribute values is inputted to the data section of the management packet.

When the information manager 310 recognizes that the operation code indicates the print designation of the store print job from the operation code of the received management packet, it generates a store print instruction to the store print processor 317. In this instance, together with the store print instruction, the job IDs and the list of the attribute IDs and attribute values stored in the data section of the management packet are also transmitted to the store print processor 317.

Store Print Processor

Figure 9:
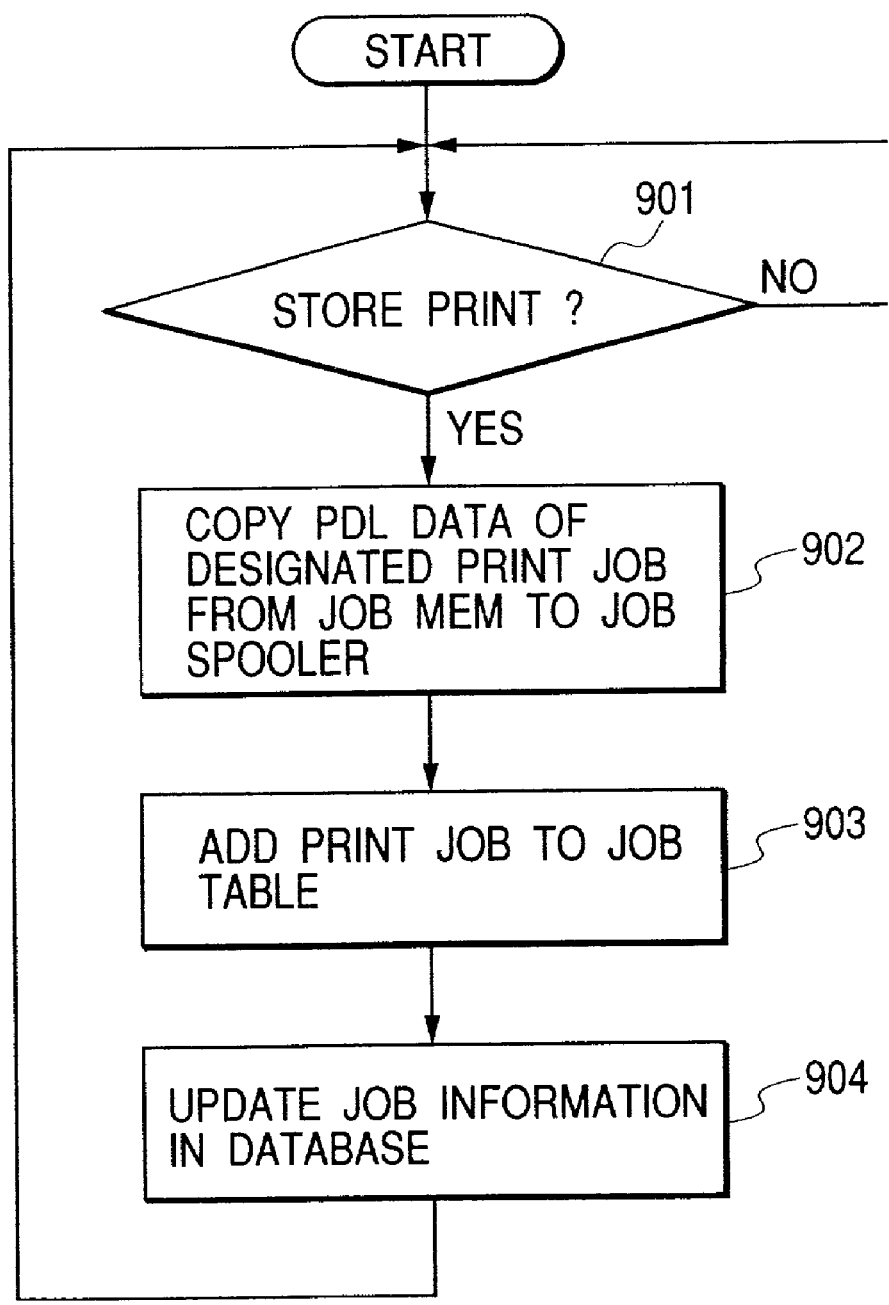
FIG. 9 is a flowchart for explaining the operation of the store print processor.

FIG. 9 is a flowchart showing the operation of the store print processor 317. First, in step 901, whether the store print instruction has been generated or not is discriminated. When it is not generated, the apparatus waits until the store print instruction is generated.

When the store print instruction is generated, in step 902, the store print instructed PDL data of the print job which has been stored in the job memory 314 is copied and stored in the job spooler 310. Further, the job information of the store print instructed print job which has been stored in the database 305 is also copied and newly stored in the database 305. In this instance, a new job ID is obtained and the PDL data is stored by using the job ID as a key, thereby enabling the PDL data to be easily extracted by using the job ID as a key when the PDL data is extracted later. Similarly, the copied job information is registered as job information of the print job having the obtained new job ID.

Further, in step 903, the normal print job having the job ID obtained in step 902 is additionally registered into the job table 313. In step 9041, the job information of the print job which has been stored in the database 305 and newly added and registered in step 903 is updated on the basis of the list of the attribute IDs and attribute values stored in the data section of the management packet.

The lists of the attribute IDs and attribute values to which the attribute change was instructed have been stored in the data section of the management packet having the operation code of the print designation of the store print job here. However, an attribute (job information) of the print job having the job ID which was newly obtained can be also changed by using another management packet, for example, the management packet having the attribute setting operation code.

In this case, after the attribute (job information) itself of the store print job was changed, the attribute (job information) of the store print job can be also copied instead of changing the attribute (job information) of the print job having the job ID newly obtained.

Control Construction of Printer

Figure 20:
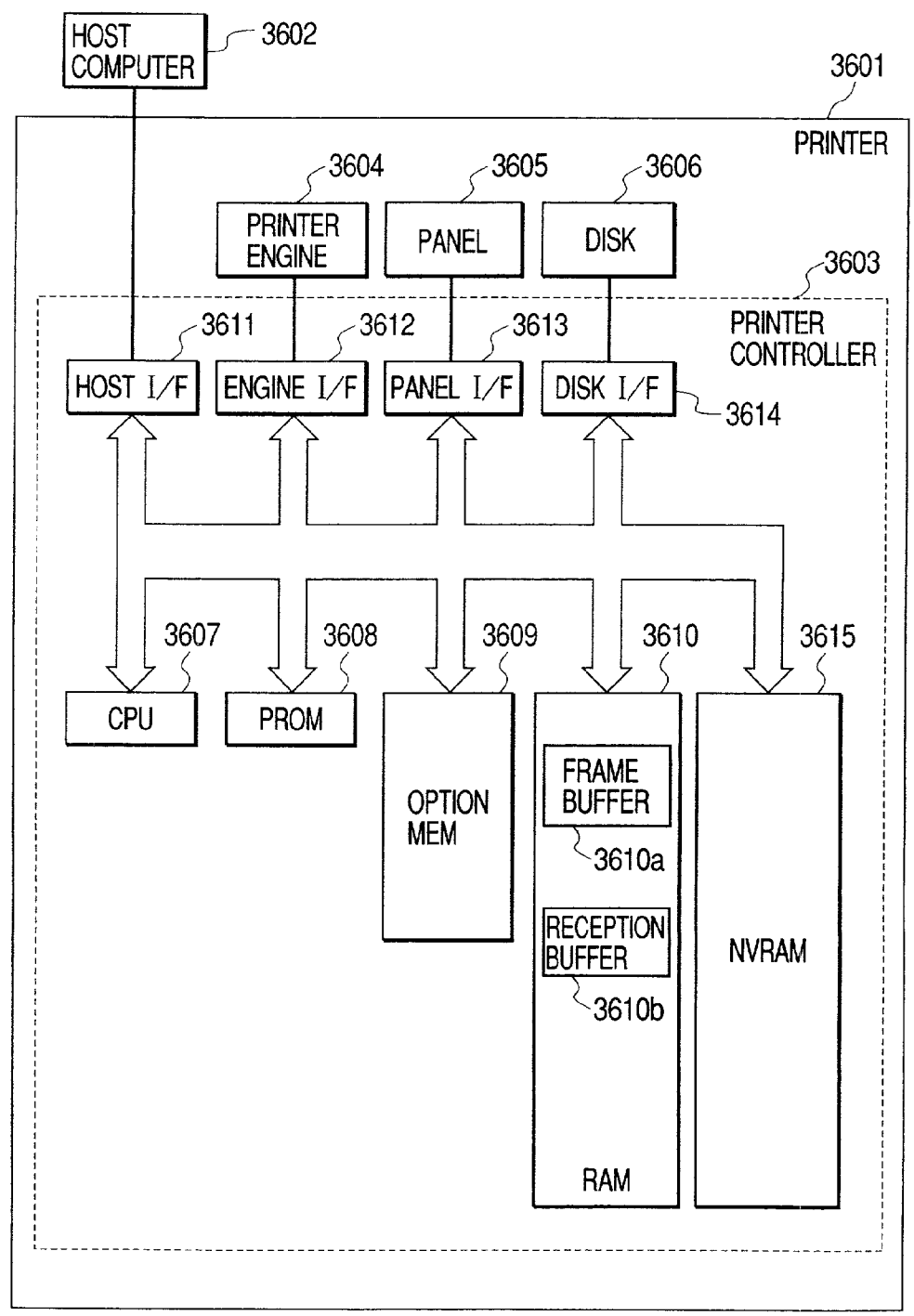
FIG. 20 is a diagram showing a control construction of the printer.

A control construction of the printer 300 will be further described. FIG. 20 is a block diagram showing a control construction of the printer 300. In FIG. 20, the printer 3601 comprises: a printer controller (hereinafter, referred to as a controller) 3603; an engine 3604; a panel 3605; and a disk 3606.

The controller 3603 comprises: a CPU 3607; a PROM 3608; an option memory 3609; the RAM 3610; a host I/F 3611; an engine I/F 3612; a panel I/F 3613; a disk I/F 3614; and the NVRAM 3615.

The CPU 3607 controls each section on the basis of control programs as shown in the flowcharts of FIGS. 5, 6, 7, 9, and 14 and the other various control programs which have been stored in the PROM 3608. The host I/F 3611 is an interface for transmitting or receiving the print job or the like to/from a host computer 3602. The engine I/F 3612 is an interface for communicating with the engine 3604 for actually performing the printing.

The panel I/F 3613 is an interface for transmitting or receiving an instruction and a status to/from the panel 3605 to show a status of the laser beam printer 3601 to the user or allowing the user to instruct a change of a print environment to the LBP 3601. The disk I/F 3614 is an interface for communicating with the disk 3606.

An option memory 3609 is a memory which is used to store a font or the like and can be inserted or pulled into/from the apparatus main body. A card, an option ROM, a flash memory, or the like can be used as an option memory. Memory areas such as frame buffer 3610*a* for storing an image object; reception buffer 3610*b* for temporarily storing the PDL data inputted from the host computer 3602, and the like are held in the RAM 3610. The RAM 3610 is also used as a work area for the CPU 3607. The NVRAM 3615 is used to store set values of various set items regarding the apparatus or print job.

The following devices are provided for the panel 3605: namely, a liquid crystal panel display for displaying information such as a status or the like of the LBP 3601 as a character train; various operation buttons for allowing the user to perform various operations for the LBP 3601; an LED for informing the user of a paper feeding location, an on-line/off-line, or the like; and the like.

The engine 3604 actually prints the image object onto a recording medium. The disk 3606 is an external storage device for storing various data. A hard disk device, a magnetooptic disk device, a floppy disk device, or the like can be used as a disk 3606. An electric power is supplied from a power supply (not shown) to the LBP 3601.

The component elements in the functional construction of the print system of FIG. 3, for example, logic channel controller 302; job pre-processor 303; PDL translator 306; drawer 308; information manager 310; interrupt processor 312; a stop/restart processor 315; a promote processor 316; and the like are realized by a method whereby the CPU 3607 in the printer 3601 in FIG. 20 executes the control program stored in the PROM 3608. The job spooler 304, database 305, job table 313, and draw buffer 307 in FIG. 3 are assured on the RAM 3610 or disk 3606 of the printer 3601 in FIG. 20.

Control Construction of Host Computer

Figure 21:
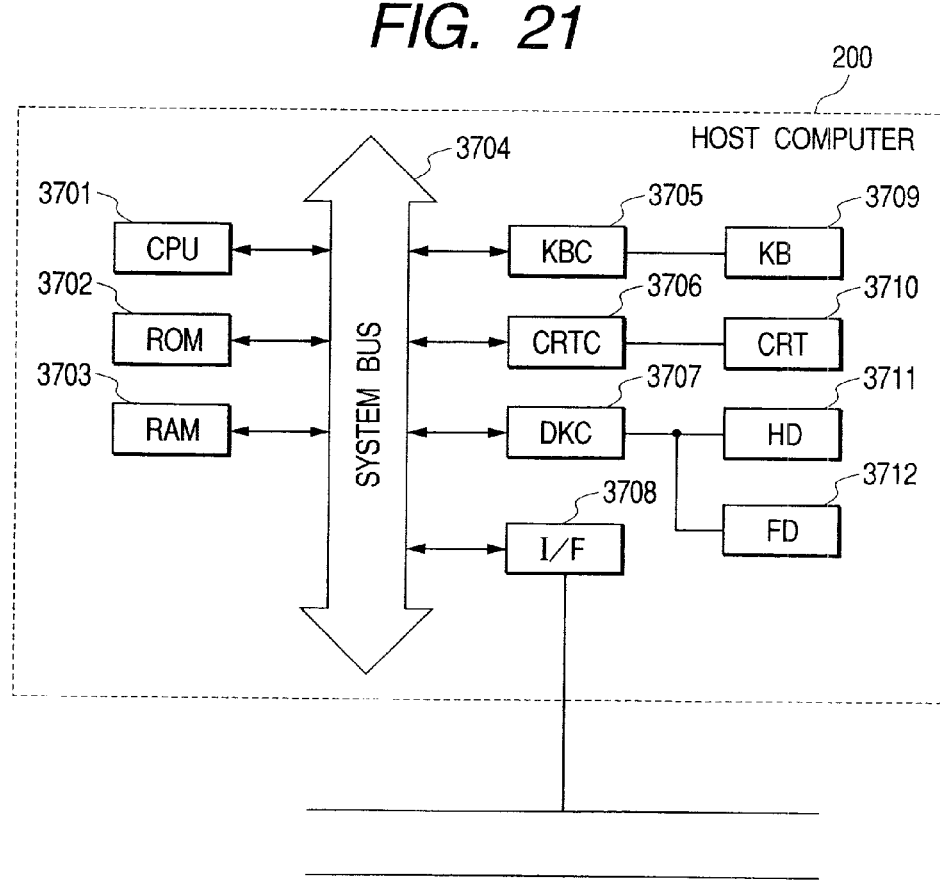
FIG. 21 is a diagram showing a control construction of the host computer.

A control construction of the host computer 200 will be further described. FIG. 21 is a block diagram showing the control construction of the host computer 200. In FIG. 21, a CPU 3701 executes control programs stored on a storage medium such as ROM 3702, hard disk (HD) 3711, floppy disk (FD) 3712, or the like and integratedly controls each device that is connected to a system bus 3704.

An RAM 3703 functions as a main memory, a work area, or the like for the CPU 3701. A keyboard controller (KBC) 3705 controls an instruction input by the user from a keyboard (KB) 3709, a pointing device (not shown), or the like.

A CRT controller (CRTC) 3706 controls a display on the CRT display (CRT) 3710. A disk controller (DKC) 3707 controls accesses to the hard disk (HD) 3711 and floppy disk (FD) 3712 for storing a boot program, various applications, an edition file, a user file, a control program, and the like. An interface card (IC) 3708 bidirectionally transmits or receives data to/from the printer 300 via the communication medium.

The component elements in the functional construction of the print system of FIG. 2, for example, logic channel controller 206, job packet generator 207, printer driver 202, application 201, and utility 205 are realized by a method whereby the CPU 3701 in the host computer 200 in FIG. 21 executes the control program stored in the ROM 3702 or HD 3711. The transmission buffer 203 in FIG. 2 is held on the RAM 3703 or HD 3711 in the host computer 200 in FIG. 21.

Laser Beam Printer

Figure 16:
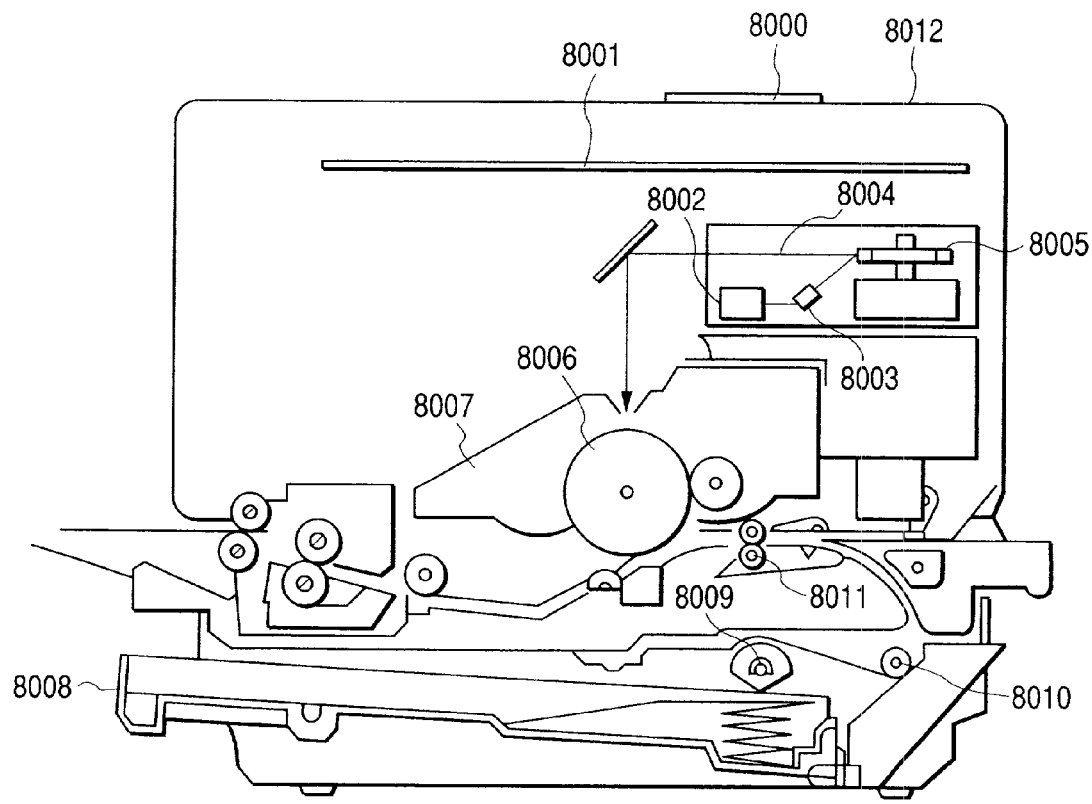
FIG. 16 is a cross sectional view showing an internal structure of a laser beam printer (hereinafter, abbreviated to LBP)

FIG. 16 is a cross sectional view showing an internal structure of a laser beam printer (hereinafter, abbreviated to LBP) as an example of the printer in FIG. 3 or 20. The LBP can input character pattern data or the like and print an image onto a recording paper. In FIG. 16, reference numeral 8012 denotes an LBP main body for forming an image onto a recording paper as a recording medium on the basis of a character pattern or the like which is supplied. Reference numeral 8000 denotes an operation panel on which switches for the operation, an LED display, and the like are arranged; and 8001 denotes a printer control unit for controlling the whole LBP 8012 and analyzing character pattern information or the like. The printer control unit 8001 converts mainly the character pattern information into a video signal and supplies it to a laser driver 8002. The laser driver 8002 is a circuit for driving a semiconductor laser 8003. The laser driver on/off switches a laser beam 8004 which is emitted from the semiconductor laser 8003 in response to the inputted video signal. The laser beam 8004 is swung to the right and left by a rotary polygon mirror 8005 and scans on an electrostatic drum 8006. Thus, an electrostatic latent image of EL character pattern is formed on the electrostatic drum 8006. The latent image is developed by a developing unit 8007 arranged around the electrostatic drum 8006 and, thereafter, transferred onto the recording paper. Cut sheets are used as recording papers. The cut sheet recording papers are enclosed on a plurality of sheet cassettes 8008 corresponding to a plurality of kinds of papers set in the LBP 8012. The papers are conveyed one by one into the apparatus by a paper feed roller 8009 and conveying rollers 8010 and 8011 and supplied to the electrostatic drum 8006.

Ink Jet Recording Apparatus

Figure 17:
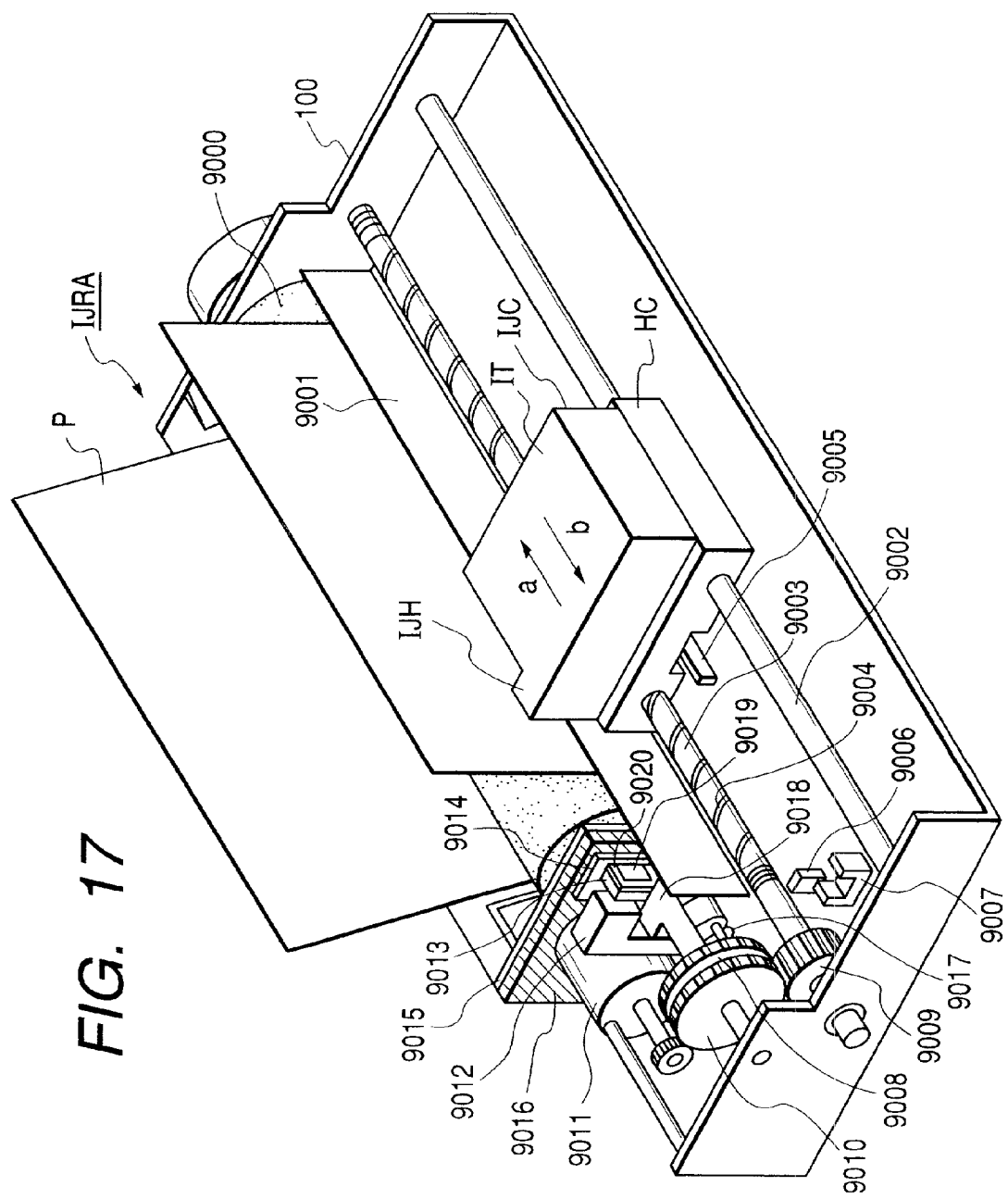
FIG. 17 is an external view of an ink jet recording apparatus IJRA.

FIG. 17 is a schematic diagram of an ink jet recording apparatus IJRA as an example of the printer in FIG. 3. In the diagram, a carriage HC is come into engagement with a spiral groove 9003 formed on a lead screw 9004 which is rotated via driving force transfer gears 9010 and 9008 in an interlocking relational manner with a forward/backward rotation of a driving motor 9011. The carriage HC has a pin (not shown) and is reciprocated in the directions shown by arrows a and b. An ink jet cartridge IJC is mounted on the carriage HC. A paper pressing plate 9001 presses the paper onto a platen 9000 over the moving direction of the carriage. Reference numerals 9006 and 9007 denote photocouplers serving as home position detecting means for confirming the existence of a lever 9005 of the carriage in a region where each photocoupler is arranged and, thereby, performing a switching of the rotating direction of the motor 9011, or the like. Reference numeral 9013 denotes a member for supporting a cap member 9019 for capping a front surface of a recording head; 9012 sucking means for sucking the air in the cap and performing a sucking/recovery of a recording head via an opening 9020 in the cap; 9014 a cleaning blade; and 9016 a member for enabling the cleaning blade to be moved forward or backward. Those members are supported by a main body supporting plate 9015. It will be obviously understood that the cleaning blade is not limited to a shape shown in the diagram but any other well-known cleaning blade can be applied to the embodiment. Reference numeral 9018 denotes a lever for starting the sucking operation of the sucking/recovery. The lever is moved in association with the movement of a cam 9017 adapted to be come into engagement with the carriage. A driving force from the driving motor is transferred by well-known transfer means such as a clutch switching or the like. A desired process among the capping, the cleaning, and the sucking/recovery can be performed at a position corresponding thereto owing to the action of the lead screw 9004 when the carriage arrives at a region on the home position side. However, a construction in which a desired operation is performed at a well-known timing can be also applied to the embodiment.

Control Program

The invention can be applied to a system comprising a copying apparatus, a printer, a scanner, or the like which solely exists or can be also applied to an apparatus comprising one equipment (for example, a copying apparatus, a facsimile apparatus, or the like).

Figure 19:
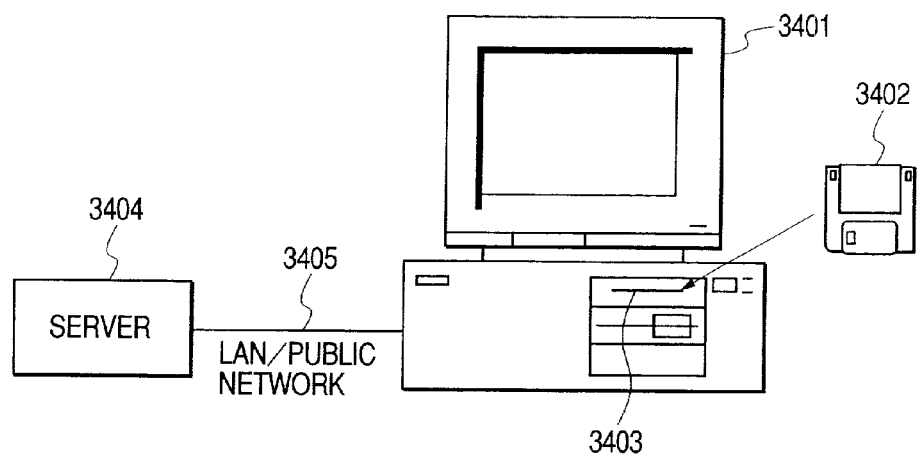
FIG. 19 is a diagram showing a supplying method of the program codes.

The object of the invention is accomplished by a method whereby a storage medium (FIG. 18) on which program codes of software (control program) to realize the functions of the embodiments mentioned above have been recorded is supplied to the system as shown in FIGS. 20 and 21 and an apparatus (CPU 3607, CPU 3701) of the system reads out and executes the program codes stored on the storage medium. As a method of supplying the program or data, as shown in FIG. 19, it is common to use a method whereby the program codes are stored in a floppy disk (FD) 3402 and supplied to the host computer 200 or printer 300. In this case, the program codes themselves read out from the storage medium realize the functions of the embodiments mentioned above. The storage medium on which the program codes have been stored constructs the invention.

A storage medium for supplying the program codes is not limited to the floppy disk or hard disk but, for example, an optical disk, a magnetooptic disk, a CD-ROM, a CD-R (Compact Disk-Recordable), a magnetic tape, a non-volatile memory card, an ROM, or the like can be also used.

As a method of supplying the program or data, as shown in FIG. 19, it is common to use a method whereby they are supplied from a server apparatus to the host computer 200 or printer 300 via an LAN/public network 3405. In this case, the program codes themselves read out from the storage medium realize the functions of the embodiments and the server apparatus which sent the program codes constructs the invention.

The invention incorporates not only a case where the functions of the embodiments are realized by executing the read-out program codes by the computer but also a case where the OS (Operating System) or the like which is operating on the computer executes a part or all of the actual processes on the basis of instructions of the program codes and the functions of the embodiments are realized by those processes. Further, the invention also incorporates a case where the program codes read out from the storage medium are written into a memory equipped for a function expanding board inserted into the computer or a function expanding unit connected to the computer and, thereafter, a CPU or the like equipped for the function expanding board or function expanding unit executes a part or all of the actual processes on the basis of instructions of the program codes, and the functions of the embodiments are realized by those processes.

As described above, according to the invention, the attribute (job information) of the print job stored once in the printer is changed and the reprinting can be executed a few times.

In the case where, under a network environment, the print job is sent to a printer installed at a remote position and a shortage of a memory capacity occurs when the user tries to store the print job, the user can recognize the failure of the storage of the print job due to the shortage of the memory capacity and newly retransmit the print job.

What is claimed is:

1. A print control apparatus for receiving print jobs including print data from an external apparatus and allowing an image forming unit to form an image on the basis of image data, comprising:
a first storing unit adapted to store print data of a first type of print job;
a second storing unit adapted to store print data of a second type of print job;
an information storing unit adapted to store attribute information of the first type of print job whose print data is stored in said first storing unit and attribute information of the second type of print job whose print data is stored in said second storing unit;
a generating unit adapted to analyze the print data stored in said first storing unit and generating image data based on the analyzed print data;
an image formation control unit adapted to allow the image forming unit to form an image on the basis of the image data generated by said generating unit, wherein said image formation control unit further allows the image forming unit to form an image corresponding to the second type of print job, in accordance with a printing instruction input separately from the print job;
a storage control unit adapted to copy the print data stored in said second storing unit and storing the copied print data into said first storing unit, in accordance with the printing instruction; and
an information storage control unit adapted to copy attribute information of the second type of print job in said information storing unit and storing the copied attribute information as attribute information corresponding to the copied print data into said information storing unit, in accordance with the printing instruction.

2. An apparatus according to claim 1, wherein the second type of print job includes a storing instruction instructing the storing of the print data in said second storing unit, and the first type of print job does not include the storing instruction.

3. An apparatus according to claim 1, wherein, in response to the printing instruction from the external apparatus, said information storage control unit stores attribute information sent from the external apparatus into said information storing unit.

4. An apparatus according to claim 1, further comprising and adding unit adapted to add identification information for identifying the print jobs to the first type of print jobs,
wherein, when said storage control unit copies the print data and stores the copied print data into said first storing unit, said adding unit adds the identification information to a print job corresponding to the copied print data, and
wherein the identification information added to the print job corresponding to the copied print data corresponds to the copied attribute information stored in said information storing unit.

5. An apparatus according to claim 4, wherein
when said storage control unit copies the print data of the second type of print job and stores the copied print data into said first storing unit, in accordance with the printing instruction, said first storing unit stores the print data so that said print data can be accessed on the basis of the identification information newly added by said adding unit, and
when said information storage control unit stores the attribute information into said information storing unit in accordance with the printing instruction, said information storing unit stores the attribute information so that said attribute information can be accessed on the basis of the identification information.

6. An apparatus according to claim 4, wherein said generating unit analyzes the print data of a print job that corresponds to identification information existing at a header portion in an order table and, when said storage control unit copies the print data of the second type of print job and stores the copied print data into said first storing unit, identification information added by said adding unit is registered in the order table.

7. A print control method of receiving print jobs including print data from an external apparatus and allowing an image forming unit to form an image on the basis of image data, comprising:
a first storing step of storing print data of a first type of print job into a first storing unit;
a second storing step of storing print data of a second type of print job into a second storing unit;
an information storing step of storing, in an information storing unit, attribute information of the first type of print job whose print data is stored in the first storing unit;

a generating step of analyzing the print data stored in the first storing unit and generating image data based on the analyzed print data;

an image formation control step of allowing the image forming unit to form an image on the basis of the image data generated in said generating step, and allowing the image forming unit to form an image corresponding to the second type of print job, in accordance with a printing instruction input separately from the print job;

a storage control step of copying the print data stored in the second storing unit and storing the copied print data into the first storing unit, in accordance with the printing instruction; and an information storage control step, of copying attribute information of the second type of print job and storing, in the information storing means, the copied attribute information, in accordance with the printing instruction.

8. A method according to claim 7, wherein the second type of print job includes a storing instruction instructing the storing of the print data in said second storing unit, and the first type of print job does not include the storing instruction.

9. A method according to claim 7, wherein, in said information storage control step, in response to the printing instruction from the external apparatus, attribute information sent from the external apparatus is stored into the information storage unit.

10. A method according to claim 7, further comprising an adding step of adding identification information for identifying the print jobs to the first type of print jobs, wherein, when in said storage control step the print data is copied and the copied print data is stored into the first storing unit, execution of said adding step adds the identification information to a print job corresponding to the copied print data, and wherein the identification information added to the print job corresponding to the copied print data corresponds to the copied attribute information stored in said information storing step.

11. A method according to claim 10, wherein in said storage control step, when the print data of the second type of print job is copied and stored into the first storing unit and the attribute information of the print job is copied and stored into the information storing unit in accordance with the printing instruction, the first storing unit stores the print data so that the print data can be accessed on the basis of the identification information newly added in said adding step, and when in said information storage control step the attribute information is stored into the information storing unit in accordance with the printing instruction, the information storing unit stores the attribute information so that the attribute information can be accessed on the basis of the identification information.

12. A method according to claim 10, wherein in said generating step, the print data of a print job that corresponds to identification information existing at a header portion in an order table and, when said storage control unit copies the print data of the second type of print job and stores the copied print data into the first storing unit, identification information added in said adding step is registered in the order table.

13. A control program, stored in a computer-readable medium, for receiving print jobs including print data from an external apparatus and allowing an image forming unit to form an image on the basis of image data, comprising:

a first storing step of storing print data of a first type of print job into a first storing unit;

a second storing step of storing print data of a second type of print job into a second storing unit;

an information storing step of storing, in information storing unit, attribute information of the first type of print job whose print data is stored in the first storing unit;

a generating step of analyzing the print data stored in the first storing unit and generating image data based on the analyzed print data;

an image formation control step of allowing the image forming unit to form an image on the basis of the image data generated in said generating step, and further allowing the image forming unit to form an image corresponding to the second type of print job, in accordance with a printing instruction input separately from the print job;

a storage control step of copying the print data stored in the second storing unit and storing the copied print data into the first storing unit, in accordance with the printing instruction; and an information storage control step of for copying attribute information of the second type of print job and storing the copied attribute information into the information storing unit, in accordance with the printing instruction.

14. A program according to claim 13, wherein the second type of print job includes a storing instruction instructing the storing of the print data in the second storing unit, and the first type of print job does not include the storing instruction.

15. A program according to claim 13, wherein, in said information storage control step, in response to the printing instruction from the external apparatus, attribute information sent from the external apparatus is stored into the information storage unit.

16. A program according to claim 13, further comprising an adding step of adding identification information for identifying the print jobs to the first type of print jobs, wherein when, in said storage control step, the print data is copied and the copied print data is stored into the first storing unit, execution of said adding unit adds the identification information to a print job corresponding to the copied print data, and wherein the identification information added to the print job corresponding to the copied print data corresponds to the copied attribute information stored in said information storing step.

17. A program according to claim 16, wherein in said storage control step, when the print data of the second type of print job is copied and stored into the first storing unit and the attribute information of the print job is copied and stored into the information storing unit in accordance with the printing instruction, the first storing unit stores the print data so that the print data can be accessed on the basis of the identification information newly added in said adding step, and when, in said information storage control step, the attribute information is stored into the information storing unit in accordance with the printing instruction, the information storing unit stores the attribute information so that the attribute information can be accessed on the basis of the identification information.

18. A program according to claim 16, wherein print data existing at a header portion in an order table and, when in said storage control step the print data of the second type of print job is copied and the copied print data is stored into the first storing unit, identification information added in said adding step is registered in the order table.

19. An information processing apparatus connected to a printer that receives a store print job and prints an image based on the store print job, in accordance with a print command that is inputted separately from the store print job, comprising:
   a number obtaining unit adapted to obtain a number of store print jobs from the printer;
   an obtaining unit adapted to obtain information regarding the store print jobs from the printer; and
   a list display unit adapted to control a list of the store print jobs to be displayed on a display unit on the basis of the information obtained by said obtaining unit,
   wherein if a second number of store print jobs obtained by said second number obtaining unit has been changed from the first number of store print jobs obtained by said first number obtaining unit, said obtaining unit obtains the information from the printer.

20. An apparatus according to claim 19, wherein said number obtaining unit comprises a first number obtaining unit adapted for obtaining the first number of store print jobs present in the printer from the printer and a second number obtaining unit adapted for obtaining the second number of store print jobs present in the printer from the printer after the first number obtaining unit obtains the first number of store print jobs.

21. An apparatus according to claim 19, further comprising:
   a selecting unit adapted to select any of the store print jobs displayed on the display unit; and
   an issuing unit adapted to issue the print command for the selected store print job.

22. An apparatus according to claim 21, wherein information to designate the number of copies is included in the print command.

23. An apparatus according to claim 21, wherein information to designate a paper ejecting method is included in the print command.

24. An information processing method for communicating with a printer that receives a store print job and prints an image based on the store print job, in accordance with a print command that is inputted separately from the store print job, comprising:
   a number obtaining step of obtaining a number of store print jobs from the printer;
   an obtaining step of obtaining information regarding the store print jobs from the printer; and
   a list display step of controlling a list of the store print jobs to be displayed on a display unit on the basis of the information obtained in said obtaining step,
   wherein if a second number of store print jobs obtained in said number obtaining step has been changed from a first number of store print jobs obtained in said number obtaining step, then in said obtaining step the information is obtained from the printer.

25. A method according to claim 24, wherein said number obtaining step comprises a first number obtaining step of obtaining the first number of store print jobs present in the printer from the printer and a second number obtaining step of obtaining the second number of store print jobs present in the printer from the printer after the first number obtaining step obtains the first number of store print jobs.

26. A method according to claim 24, further comprising:
   a selecting step of selecting any of the store print jobs displayed on the display unit; and
   an issuing step of issuing the print command for the selected store print job.

27. A method according to claim 26, wherein information to designate the number of copies is included in the print command.

28. A method according to claim 26, wherein information to designate a paper ejecting method is included in the print command.

29. An information processing program, stored in a computer-readable medium, for communicating with a printer that receives a store print job and prints an image based on the store print job, in accordance with a print command that is inputted separately from the store print job, comprising:
   a number obtaining step of obtaining a number of store print jobs from the printer;
   an obtaining step of obtaining information regarding the store print jobs from the printer; and
   a list display step of controlling a list of the store print jobs to be displayed on a display unit on the basis of the information obtained in said obtaining step,
   wherein if a second number of store print jobs obtained in said number obtaining step has been changed from a first number of store print jobs obtained in said number obtaining step, then in said obtaining step the information is obtained from the printer.

30. An information processing program, stored in a computer-readable medium according to claim 29, wherein said number obtaining step comprises a first number obtaining step of obtaining the first number of store print jobs present in the printer from the printer and a second number obtaining step of obtaining the second number of store print jobs present in the printer from the printer after the first number obtaining step obtains the first number of store print jobs.

31. A program according to claim 29, further comprising:
   a selecting step of selecting any of the store print jobs displayed on the display unit; and
   an issuing step of issuing the print command for the selected store print job.

32. A program according to claim 31, wherein information to designate the number of copies is included in the print command.

33. A program according to claim 31, wherein information to designate a paper ejecting method is included in the print command.

34. A print control apparatus for receiving print jobs from an external apparatus and controlling an image forming unit to form an image based on the print job, comprising:
   a management unit adapted to manage the number of store print jobs and job information concerning each print job, wherein the image forming unit forms an image based on the store print job in accordance with a print command that is inputted separately from the store print job;
   sending job information concerning each store print jobs to the external apparatus in accordance with a request from the external apparatus.

35. An apparatus according to claim 34, wherein the external apparatus discriminates whether the number of store print jobs has been changed, and sends the request for the job information if the number of store print jobs has been changed.

36. An apparatus according to claim 34, wherein said number sending unit sends the number of store print jobs to the external apparatus in accordance with a request from the external apparatus.

37. An apparatus according to claim 34, wherein the job information includes information indicating a name of the store print job or information indicating an owner of the store print job.

38. A print control method for receiving print jobs from an external apparatus and controlling an image forming unit to form an image based on the print job, comprising the steps of:
- counting the number of store print jobs, wherein the image forming unit forms an image based on the store print job in accordance with a print command that is inputted separately from the store print job;
- sending the number of store print jobs in said print control apparatus to the external apparatus; and
- sending job information concerning each store print jobs to the external apparatus in accordance with a request from the external apparatus.

39. A method according to claim 38, wherein the external apparatus discriminates whether the number of store print jobs had been changed, and sends the request for the job information if it is discriminated that the number of store print jobs has been changed.

40. A method according to claim 38, wherein said number sending step sends the number of store print jobs to the external apparatus in accordance with a request from the external apparatus.

41. A method according to claim 38, wherein the job information includes information indicating a name of the store print job or information indicating an owner of the store print job.

42. A information processing apparatus connected to a printer that receives a print job and prints an image based on the print job, comprising:
- a processor adapted to obtain a number of print jobs form the printer and obtain information regarding the print jobs from the printer; and
- a display adapted to display the information regarding the print jobs obtained by said processor,
- wherein if a second number of print jobs obtained by said processor has been changed from a first number of print jobs obtained by said processor, said processor obtains the information regarding the print jobs from the printer.

43. An apparatus according to claim 42, wherein the printer prints the image based on the print job in accordance with a print command that is inputted separately from the print job.

44. An apparatus according to claim 42, wherein said processor includes a first number obtaining unit adapted to obtain the first number of store print jobs present in the printer from the printer and a second number obtaining unit adapted to obtain the second number of store print jobs present in the printer from the printer after the first number obtaining unit obtains the first number of store print jobs.

* * * * *

UNITED STATES PATENT AND TRADEMARK OFFICE
CERTIFICATE OF CORRECTION

PATENT NO. : 7,034,954 B1
APPLICATION NO. : 09/572914
DATED : April 25, 2006
INVENTOR(S) : Takeshi Utsunomiya It is certified that error appears in the above-identified patent and that said Letters Patent is hereby corrected as shown below:

TITLE PAGE:
(56) References Cited FOREIGN PATENT DOCUMENTS, "10011234 A" should read -- 10-11234 A --.

COLUMN 1:
Line 15, "media" should read -- medium --.

COLUMN 5:
Line 29, "cross sectional" should read -- cross-sectional --.

COLUMN 10:
Line 35, " "184.4:0x20" " should read -- "1284.4:0x20" --.

COLUMN 11:
Line 45, " "o" " should read -- "O" --.

COLUMN 19:
Line 44, "cross sectional" should read-- cross-sectional --; and
Line 65, "EL" should read -- a --.

COLUMN 22:
Line 21, "and" should read -- an --.

COLUMN 24:
Line 23, "for" should be deleted.

COLUMN 26:
Claim 34 should read:
-- A print control apparatus for receiving print jobs from an external apparatus and controlling an image forming unit to form an image based on the print job, comprising:
    a management unit adapted to manage the number of store print jobs and job information concerning each print job, wherein the image forming unit forms an image based on the store print job in accordance with a print command that is inputted separately from the store print job;
    a number sending unit adapted to send the number of store print jobs in said print control apparatus to the external apparatus; and
    an information sending unit adapted to send the job information to the external apparatus in accordance with a request front the external apparatus. --.

UNITED STATES PATENT AND TRADEMARK OFFICE
CERTIFICATE OF CORRECTION

PATENT NO. : 7,034,954 B1
APPLICATION NO. : 09/572914
DATED : April 25, 2006
INVENTOR(S) : Takeshi Utsunomiya It is certified that error appears in the above-identified patent and that said Letters Patent is hereby corrected as shown below:

COLUMN 27:
Line 15, "jobs" should read -- job --.

COLUMN 28:
Line 3, "A" should read -- An --.
Line 6, "form" should read -- from --.

Signed and Sealed this

Nineteenth Day of December, 2006

JON W. DUDAS
*Director of the United States Patent and Trademark Office*